United States Patent [19]

Wangler et al.

[11] Patent Number: 5,793,491
[45] Date of Patent: *Aug. 11, 1998

[54] INTELLIGENT VEHICLE HIGHWAY SYSTEM MULTI-LANE SENSOR AND METHOD

[75] Inventors: Richard J. Wangler, Maitland; Robert L. Gustavson, Winter Springs; Robert E. McConnell, II, Longwood; Keith L. Fowler, Orlando, all of Fla.

[73] Assignee: Schwartz Electro-Optics, Inc., Orlando, Fla.

[*] Notice: The term of this patent shall not extend beyond the expiration date of Pat. No. 5,546,188.

[21] Appl. No.: 730,732

[22] Filed: Oct. 11, 1996

Related U.S. Application Data

[63] Continuation-in-part of Ser. No. 693,667, Aug. 9, 1996, Pat. No. 5,757,472, which is a continuation of Ser. No. 179,568, Jan. 10, 1994, Pat. No. 5,546,188, which is a continuation-in-part of Ser. No. 997,737, Dec. 30, 1992, Pat. No. 5,278,423, and Ser. No. 980,273, Nov. 23, 1994, Pat. No. 5,321,490.

[51] Int. Cl.$^6$ ............................................. G01B 11/24
[52] U.S. Cl. ............................ 356/376; 356/398; 356/4.01
[58] Field of Search .................................... 356/4.01, 5.01, 356/376, 398

[56] References Cited

U.S. PATENT DOCUMENTS

| | | | |
|---|---|---|---|
| 4,335,962 | 6/1982 | DiMatteo et al. | 356/376 |
| 5,074,673 | 12/1991 | Sowell et al. | 356/5 |
| 5,111,056 | 5/1992 | Yoshimura et al. | 250/560 |
| 5,528,354 | 6/1996 | Uwira | 356/3.01 |
| 5,546,188 | 8/1996 | Wangler et al. | 356/376 |

*Primary Examiner*—Mark Hellner
*Attorney, Agent, or Firm*—Allen, Dyer, Doppelt, Milbrath & Gilchrist, P.A.

[57] ABSTRACT

An Intelligent Vehicle Highway System (IVHS) sensor provides accurate information on real-time traffic conditions that can be used for incident detection, motorist advisories, and traffic management via signals, ramp meters, and the like. A diode-laser-based Vehicle Detector And Classifier (VDAC) measures the presence, speed, and three-dimensional profiles of vehicles passing beneath it within its multi-lane field-of-view coverage. The sensor uses pulsed laser range imaging technology adapted for determining the three-dimensional profile of the vehicle. The VDAC employs a rotating polygon mirror to scan a pulsed laser rangefinder across three lanes of a highway in order to measure the presence, speed, and height profiles of vehicles in all three lanes simultaneously. A receiver accepts reflections from beams transmitted from the sensor and provides inputs for determining time of flight, and a time interval between interceptions of the two divergent beams for the vehicle. An encoder tracks the position of the mirror for providing angle data with associated range measurements. The VDAC high signal-to-noise ratio and good spatial resolution result in highly accurate traffic-parameter measurements.

24 Claims, 20 Drawing Sheets

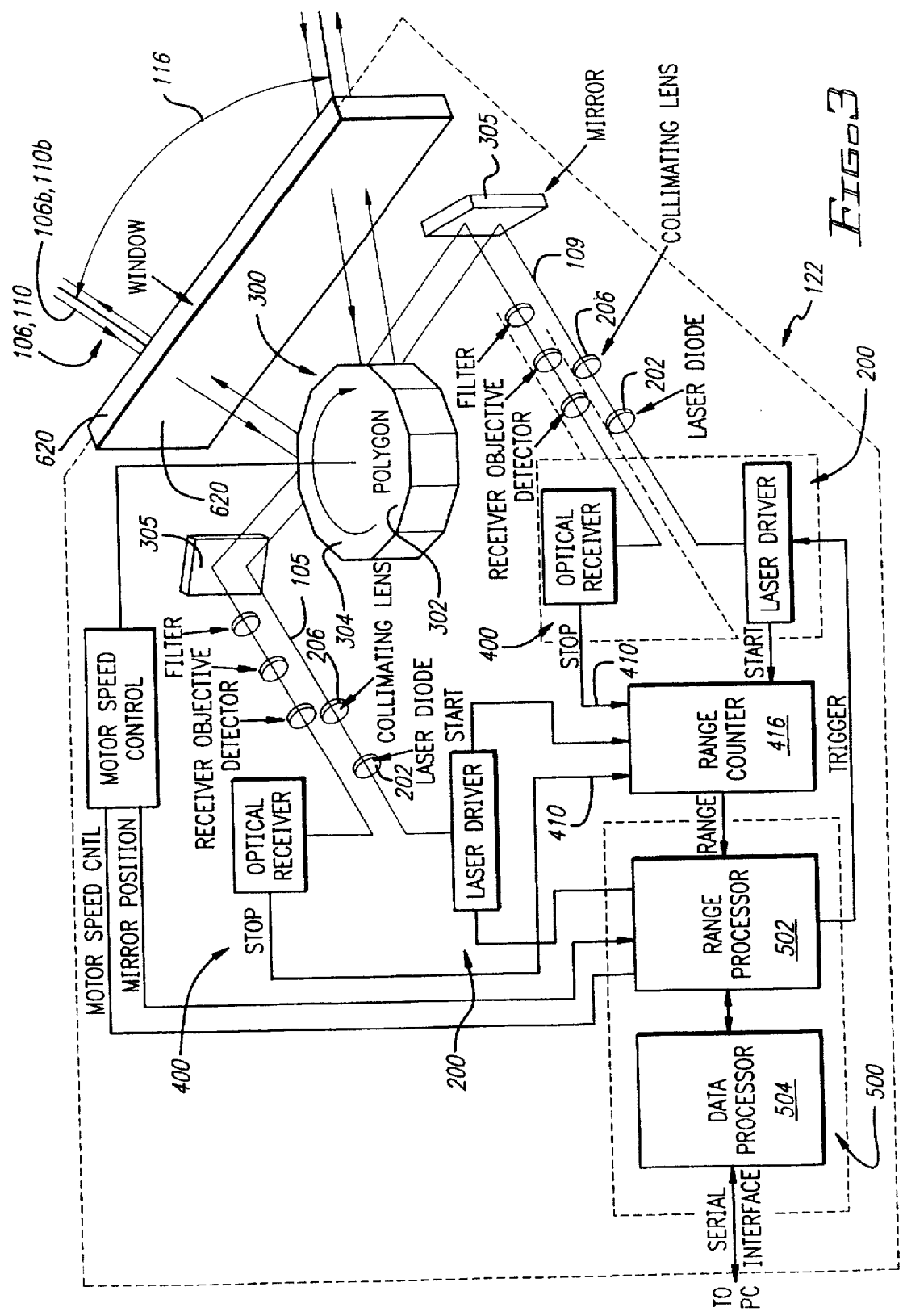

STRAIGHT TRUCK
25'-40'

3-AXLE TRACTOR SEMITRAILER
25'-40'

4-AXLE TRACTOR SEMITRAILER
38'-48'

5-AXLE TRACTOR SEMITRAILER
40'-57'

5-AXLE TRACTOR FLATBED TRAILER
38'-42'

5-AXLE TRACTOR TANK TRAILER
35'-40'

TWIN TRAILER (OR "DOUBLES")
28' — 28'

ROCKY MOUNTAIN DOUBLES (ONLY IN CERTAIN STATES)
45'-48' — 28'

TRIPLE TRAILER (ONLY IN CERTAIN STATES)
28' — 28' — 28'

TURNPIKE DOUBLES (ONLY IN CERTAIN STATES)
45'-48' — 45'-48'

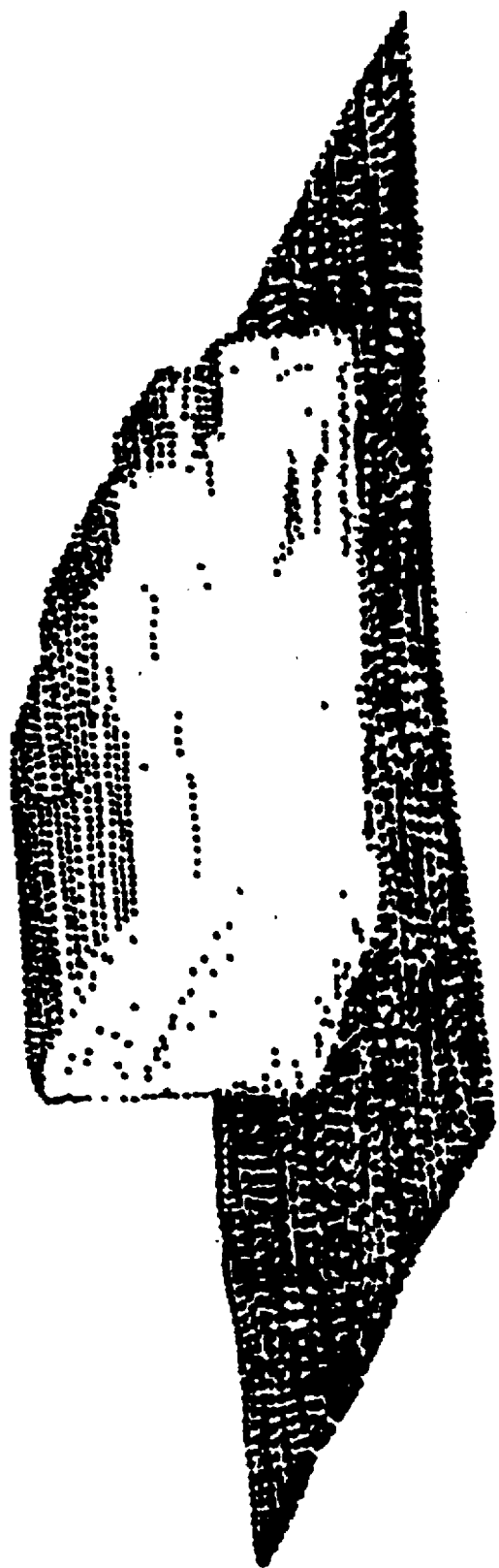

INTELLIGENT VEHICLE HIGHWAY SYSTEM MULTI-LANE SENSOR AND METHOD

CROSS REFERENCE TO RELATED APPLICATIONS

This application is a continuation-in-part of application Ser. No. 08/693,667 filed Aug. 9, 1996 for an Intelligent Vehicle Highway System Sensor and Method U.S. Pat. No. 5,757,472, which is a continuation of application Ser. No. 08/179,568, filed Jan. 10, 1994 issuing as U.S. Pat. No. 5,546,188, which itself is a continuation-in-part application of applications Ser. No. 07/997,737 filed Dec. 30, 1992 issuing as U.S. Pat. No. 5,278,423 and Ser. No. 07/980,273 filed Nov. 23, 1994 issuing as U.S. Pat. No. 5,321,490, all of which are commonly owned with the present invention.

BACKGROUND OF THE INVENTION

1. Field of the Invention

The present invention relates generally to object sensors, and in particular to laser rangefinder sensors useful in detecting vehicle speed and shape for classification and input to Intelligent Vehicle Highway Systems (IVHS).

2. Background Art

A vehicle sensor providing the presence of a vehicle in a traffic lane and indicating the vehicle speed as it passed the sensor is disclosed in the above referenced application Ser. No. 07/980,273 issuing as U.S. Pat. No. 5,321,490. A time-off-flight laser rangefinder concept is used which measures the normal distance to a highway from a fixed point above the road surface and then measures the distance to any vehicle which either passes or stops under the sensor. The concept teaches the use of two laser beams pulsing at a high rate projected across the road surface at a fixed angle between them. Because of the high repetition rate, the system is also able to determine vehicle speed with an accuracy within one mph and using this calculated speed, develop a longitudinal profile of the vehicle using consecutive range measurements as the vehicle moves under the sensor.

The principal goals of the invention are to provide active near-field object sensors which are relatively low in cost, are accurate and have utility in a wide variety of applications. The invention contemplated a sensor for detecting the presence of an object within an area located in a close range to the sensor, and includes a range finder having means for emitting a directional output of pulsed energy toward the fixed area. In a preferred arrangement, the emitting means comprises a laser diode capable of emitting pulses of coherent infrared radiation, which are used together with collimating optics and a beam splitter to provide two diverging output beams directed toward the near-field area under observation.

The sensor also includes means for receiving a portion of the energy reflected from either the area, or an object located within the area. The returned pulse energy is then provided as an input to a receiver for determining a time of flight change for pulses between the emitting and receiving means, which may be caused by the presence of an object within the area. The sensor is also provided with various features useful in providing outputs which indicate either the speed, census, size or shape of one or more objects in the area. For example, the sensor is provided with means for receiving an input from the time of flight determining means and for providing an output indicating whether the object meets one of a plurality of classification criteria (e.g., is the object an automobile, truck or motorcycle).

To achieve these and other objectives, the receiving means includes two detectors, with means for alternately selecting between the outputs of the two detectors for providing inputs to the time of flight determining means; means are also provided for measuring the time interval between interceptions of the two diverging outputs by a given object, so as to calculate the speed of the object passing through the area.

Above referenced application Ser. No. 07/997,737 issuing as U.S. Pat. No. 5,278,423 discloses the generation of three dimensional images of objects by rotating or scanning a laser beam rangefinder, operating at a high pulse rate, in a plane, where there is relative motion between the rangefinder and the object to be sensed or imaged in a direction perpendicular to the laser beam plane of rotation. This operation causes the laser rangefinder rotating beam, when passing to a side of the object, to cover the object to be sensed with rangefinder pulses, and thereby, obtain a three dimensional image of the object.

An embodiment of the three dimensional object sensor discloses sensing of trees formed in a row for purposes of spraying, counting or measuring the size of the trees. The sensor is moved along the ground traveling between rows of trees, crops or foliage with the laser rangefinder scanning on either side of the moving vehicle carrying the sensor in a plane perpendicular to the motion of the vehicle. When the sensor detects the presence of foliage, it provides a signal activating a spraying system for the efficient spraying of the tree or object being sensed. This operation ensures that spraying takes place only when there is foliage present to intercept the sprayed materials. Economic and environmental benefit is thus realized.

There have been suggestions for traffic signal controllers utilizing overhead sensors. Co-pending application makes reference to the following U.S. Pat. Nos. 3,167,739 to Girard et al; 3,436,540 to Lamorlett; 3,516,056 to Matthews; 3,532,886 to Kruger et al; 3,680,047 to Perlman; and 4,317,117 to Chasek.

Likewise referenced, near-field sensors have also been utilized as intruder alarms and as automatic door operators. Examples of such arrangements are disclosed in the following U.S. Pat. Nos. 3,605,082 to Matthews; 3,644,917 to Perlman; 3,719,938 to Perlman; 3,852,592 to Scoville et al; 3,972,021 to Leitz et al; and 4,433,328 to Saphir et al. Further, optical dimensioning techniques have been incorporated in industrial uses as disclosed in U.S. Pat. No. 4,179,216 and U.S. Pat. No. 4,490,038.

A strategic plan for Intelligent Vehicle Highway Systems in the United States was prepared in Report No: IVHS-AMER-92-3 by IVHS America and published on May 20, 1992. The document was produced, in part, under U.S. DOT, Contract Number DTFH 61-91-C-00034. The purpose of the strategic plan is to guide development and deployment of IVHS in the United States. The plan points out that there is no single answer to the set of complex problems confronting our highway systems, but the group of technologies known as IVHS can help tremendously in meeting the goals of the Intermodal Surface Transportation Efficiency Act of 1991 (ISTEA). The purpose of ISTEA is " . . . to develop a National Intermodal Transportation System that is economically sound, provides the foundation for the Nation to compete in the global economy, and will move people and goods in an energy efficient manner." It is a worthy goal to satisfy the needs identified within the ISTEA. The IVHS America plan describes these needs, one of which is Automated Vehicle Classification (AVC).

SUMMARY OF INVENTION

In view of the foregoing background, it is therefore an object of the present invention to provide a sensor capable of detecting multiple vehicles traveling within multiple parallel lanes of traffic with sufficient accuracy for classifying the vehicles. Because the sensor of the present invention accurately (±1 mi/h, 1σ) measures vehicle speed as well as vehicle count, it provides the basic data from which other traffic parameters, such as flow rate and mean speed, can be derived. A distinguishing feature which sets the sensor apart from other vehicle detectors, is the ability to accurately measure vehicle height profiles. This unique capability is utilized to classify vehicles and to identify specific vehicles when matched with downstream sensors for the determination of travel time. It is an object of the invention to improve upon the vehicle sensor of the co-pending application which scans across a lane of traffic to a sensor for scanning across multiple lanes. It is further an object of the invention to provide information useful to other Intelligent Vehicle Highway Systems and the Electronic Toll and Traffic Management (ETTM) area, in particular to Automatic Toll Collection.

These and other objects, advantages, and features of the present invention are provided by a sensor comprising laser rangefinder means for determining a range from the sensor to points on a vehicle when the vehicle travels within a sensing zone and for providing range data outputs corresponding to sensor angles for ranges from the sensor to the points on the vehicle, means for scanning the laser means within a plane generally orthogonal to a direction of travel for the vehicle, the scanning means communicating with the laser rangefinder means for determining a range for a corresponding point on the vehicle within the transverse plane, the scanning means providing means for determining the range and a corresponding sensor angle for each point within the scanning plane, deflecting means cooperating with the scanning means for deflecting the scanned beam from a first longitudinal position to a second longitudinal position, the first and second positions defining a forward and backward beam for receiving the vehicle traveling in a directing between the beams, and means for processing the ranges, corresponding angles, and interception times for the vehicle receiving the first and second beams, the processing means providing a vehicle image profile representative of the vehicle.

The sensor in a preferred embodiment comprises a forward and a backward beam emitted by the laser means. The forward and backward beams are separated by a predetermined angle and are emitted toward a fixed area through which the vehicle travels. A time signal representative of a travel time for a point on the vehicle to travel between the beams is determined from time-of-flight data provided by the range data processing means. A transmitter and receiver, along with a rotating polygon mirror are used for emitting a pair of laser beams, for directing the beams toward zones on a roadway traveled on by the vehicle, and for converting reflected laser beams from the vehicle to signal voltages representative of ranges between the receivers and defined points on the vehicle. Scanning is provided using an optically reflective surface intercepting the beams and reflecting the beams at predetermined angles from a perpendicular to the roadway. The beams reflected off of the vehicle are directed back toward the mirror into corresponding apertures of the receivers. Means are provided for rotatably moving the reflective surface across a reflective angle sufficient for reflecting the beams across a transverse portion of the vehicle, and signal means representative of the sensor angle within the beam plane are also provided. The angle signals are delivered to the processing means for providing range data at corresponding angles and the range and angle data in combination provide a transverse profile of the vehicle.

In one embodiment, the scanning is provide using a mirror intercepting the beams emitted from the transmitter and reflecting the beams onto scanning planes. The planes are set at opposing angles from a perpendicular to the roadway. The reflected beams directed back toward the mirror are directed into corresponding apertures of the receiver. A motor having a rotatable shaft is affixed to the mirror for continuously rotating the mirror about the axis, and an encoder is affixed to the motor shaft for identifying an angular position of the mirror relative to a reference angle.

Processing means comprises a microprocessor programmed to receive respective range and sensor angle data for storing and processing the data for a scanned cycle associated with a timing signal. The processed data results in a three dimensional shape profile for the vehicle. Further, the invention comprises an algorithm for comparing the vehicle shape profile with a multiplicity of predetermined vehicle shapes for classifying the vehicle.

Related applications referenced above describe an evolution of laser range finder sensors beginning with the sensor disclosed in U.S. Pat. No. 5,321,490 using a fixed bifurcated infrared laser beam to measure vehicle speed, presence, count, and its two dimensional profile. Improvements disclosed in U.S. Pat. No. 5,546,188 included a sensor having a scanning infrared laser beam for measuring vehicle speed, presence, count, a three dimensional profile, and vehicle classification based on the profile as the vehicle crossed a sensing area within a traffic lane. The improved sensor, herein described, optimizes the use of the three dimensional sensing capability and combines elements of the sensor for monitoring multiple traffic lanes for developing vehicle profiles for as vehicles pass through the sensing area comprising the multiple lanes. The disclosure of the above related applications is relied upon and incorporated herein by reference for supporting disclosure. However, the present specification includes disclosure from these related applications for convenience and completeness, as well as new disclosure which together will enable any person skilled in the art to make and use the sensor of the present invention.

While particular exemplary embodiments are disclosed in both methods and apparatus for this invention, those of ordinary skill in the art will recognize numerous possible variations and modifications. All such variations are expected to come within the scope of the present invention.

BRIEF DESCRIPTION OF DRAWINGS

A complete and enabling disclosure of the present invention, including the best mode thereof, is directed to one of ordinary skill in the art in the present specification, including reference to the accompanying figures, in which:

FIG. 3 is a schematic diagram of one preferred embodiment of the sensor of the present invention;

FIG. 13K is a perspective view illustrating a three dimensional truck profile provided by the present invention illustrated with a black and white ink tracing of a monitor screen;

DETAILED DESCRIPTION OF PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
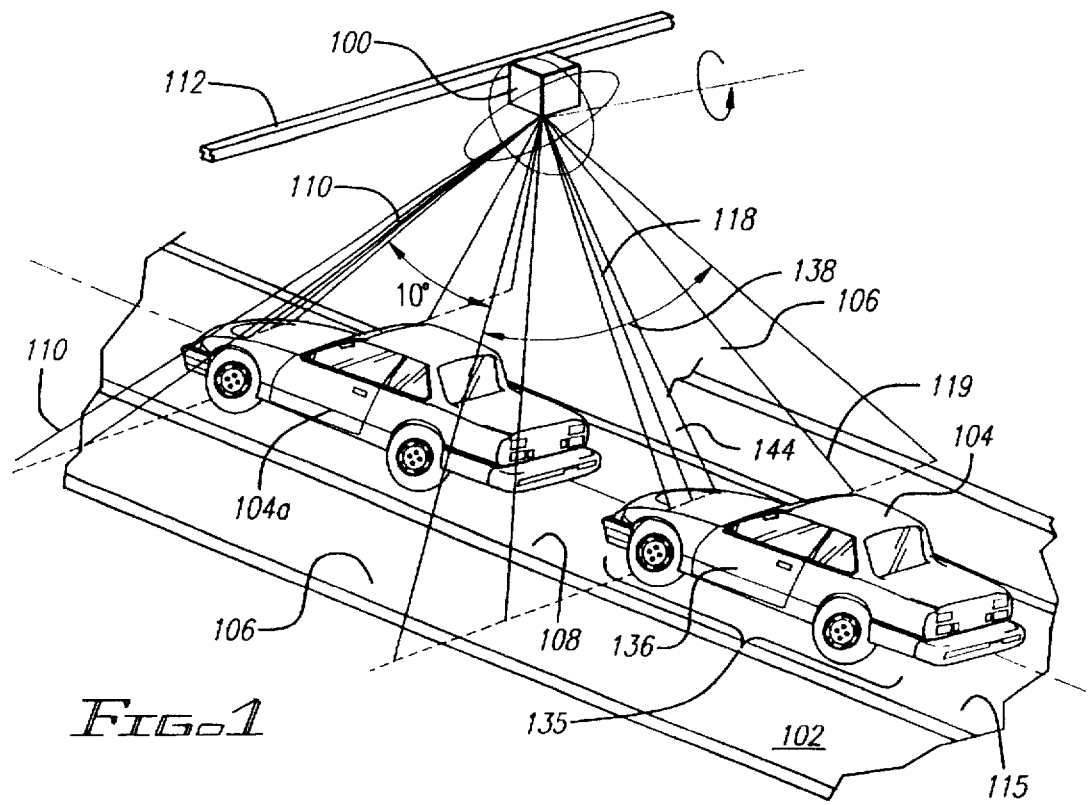
FIG. 1 is a partial perspective view illustrating one IVHS sensor of the present invention in one sensing configuration.

As illustrated with reference to FIG. 1, in preferred embodiments of the present invention, a sensor 100 is affixed above a highway 102 for sensing a vehicle 104 passing below the sensor 100. A first or forward scanned beam 106 intercepts the vehicle 104 as the vehicle 104 crosses the forward beam 106 and enters a sensing area 108 below the sensor 100 configured and described herein by way of example. A second or backward directed and scanned beam 110 intercepts the vehicle, designated as numeral 104a, as the vehicle 104a leaves the sensing area 108. By way of example, and illustrated herein with reference again to FIG. 1 and to FIG. 2, for traffic surveillance applications, the sensor 100 is mounted on cables or a mast arm 112 over the highway 102. The improved sensor 100 herein described is mounted overhead and centered between three lanes 114 of traffic. In one preferred configuration of the present embodiment, and as illustrated with reference again to FIG. 2 and to FIG. 2A, the sensor 100 is mounted over the center lane 115 of traffic with look-down angles of 10 degrees for the forward beam 106 and 0 degrees for the backward beam 110. Although it is anticipated that various angles will be used, this mounting configuration provides for good spatial resolution and reduces shadowing caused by larger vehicles. A total beam scan coverage 116 is 60 degrees, and when the sensor 100 is mounted at 30 feet above the highway 102, complete lane coverage for three 12 ft. lanes 114 typically found for the highways 102 relying on IVHS sensors.

Figure 4:
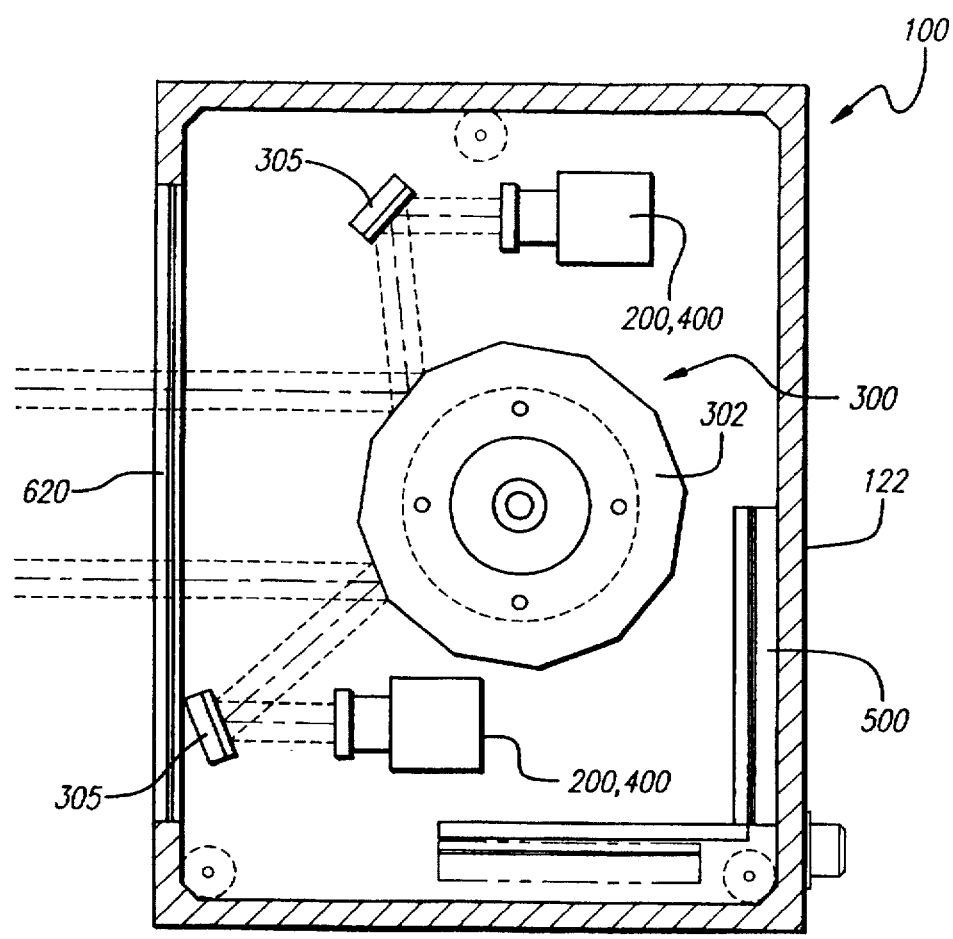
FIG. 4 is a partial top plan view of the sensor of FIG. 3.

As illustrated with reference to FIGS. 3 and 4, two beams 105, 109 comprise 904 nm radiation which are emitted by two similar transmitters 200. Each of the beams 105, 109 are directed for scanning across 30 degree scan angles with the transmitters 200 positioned for scanning the total 60 degree coverage 116. In addition, each beam 105, 109 is again split for having an angular forward and backward separation of 10 degrees, which beams 106, 110 are directed toward the highway 102 as earlier described with reference to FIGS. 1 and 2. Although most of the emitted radiation, illustrated by numerals 106a, 110a, is specularly reflected away using a mirror system 300, a small amount is diffusely reflected back, illustrated by numerals 106b, 110b, to the sensor 100 where it is detected by a pair of receivers 400. The round-trip propagation time of a laser pulse making up the beams 106, 110 is proportional to a range 118 to the vehicle 104 or the highway 102 from which the radiation is reflected. The presence of the vehicle 104 is indicated by a reduction in the range reading from the vehicle range 118 to a highway range 120. Vehicle speed is computed from the measured time interval between the interceptions of the forward and backward beams 106, 110. On-board microprocessors 500, within the sensor housing 122, are used for the determination of vehicle presence, speed, count, and classification, as will be described in further detail later in this section. A real-time clock is used to time-tag the data collected to provide, by way of example, vehicle count and average speed for each hour of the day.

As illustrated again with reference to FIGS. 3 and 4, the sensor 100, a laser rangefinder apparatus, employs a pair of InGaAs diode-laser transmitters 200 and silicon avalanche photodiode (APD) receivers 400 in a generally side-by-side configuration. Each transmitter 200 consists of a laser diode 202, its laser driver 204, and a collimating lens 206. Each optical receiver 400 is comprised of an objective lens 402, a narrow-band-optical filter 404, detector/amplifier 406, and a threshold detector, described in above referenced applications and herein later described in further detail.

The laser diode 202 used in a preferred embodiment of the present invention includes an InGaAs injection laser diode having 12 W output at 10 Amps pulsed current drive. The laser driver 204 produces a 10 Amp peak current pulse with a 3 ns rise time and an 8 ns pulse width. A trigger pulse from a scanner controller, as will be further described later in this section with discussions of the mirror system 300, triggers the laser transmitter 200 at preselected scan angles produced by the mirror system 300. The 904 nm laser beam emission is at an ideal wavelength for the silicon APD receivers 400 used.

Figure 2:
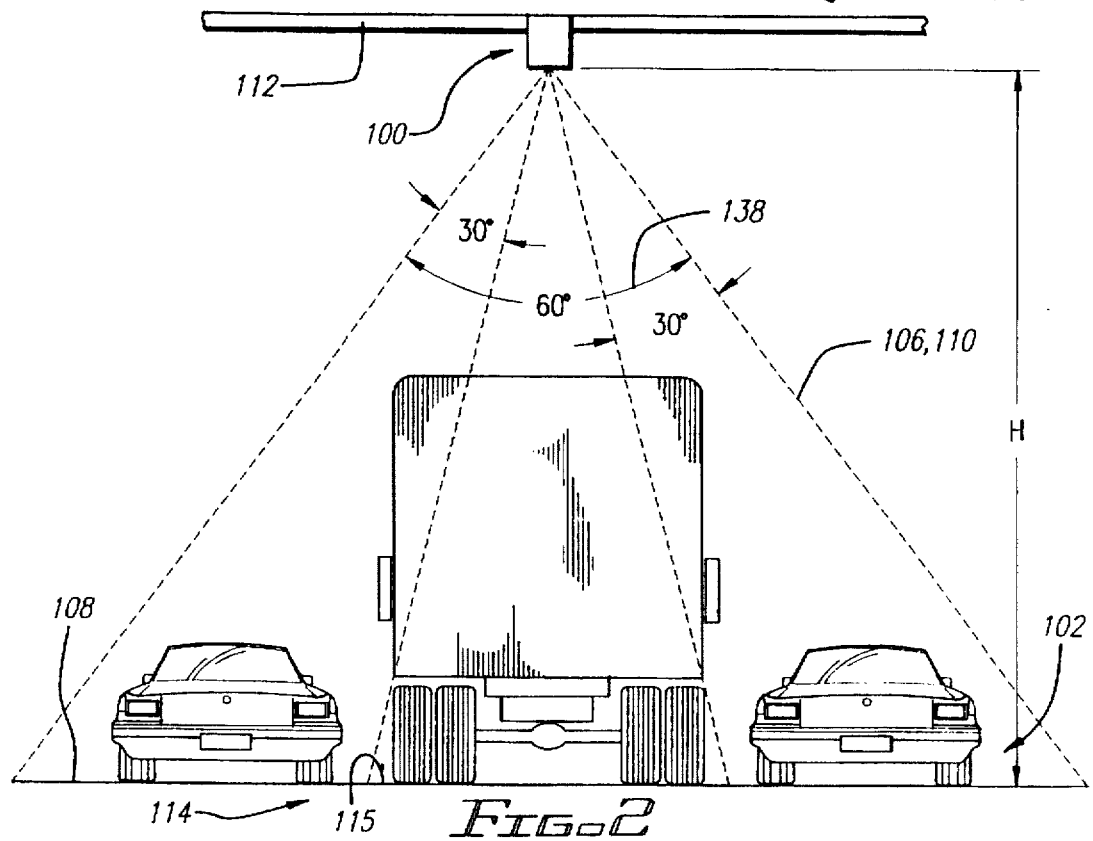
FIG. 2 is a partial elevational view of the sensor of the present invention operating with multiple traffic lanes.
Figure 2A:
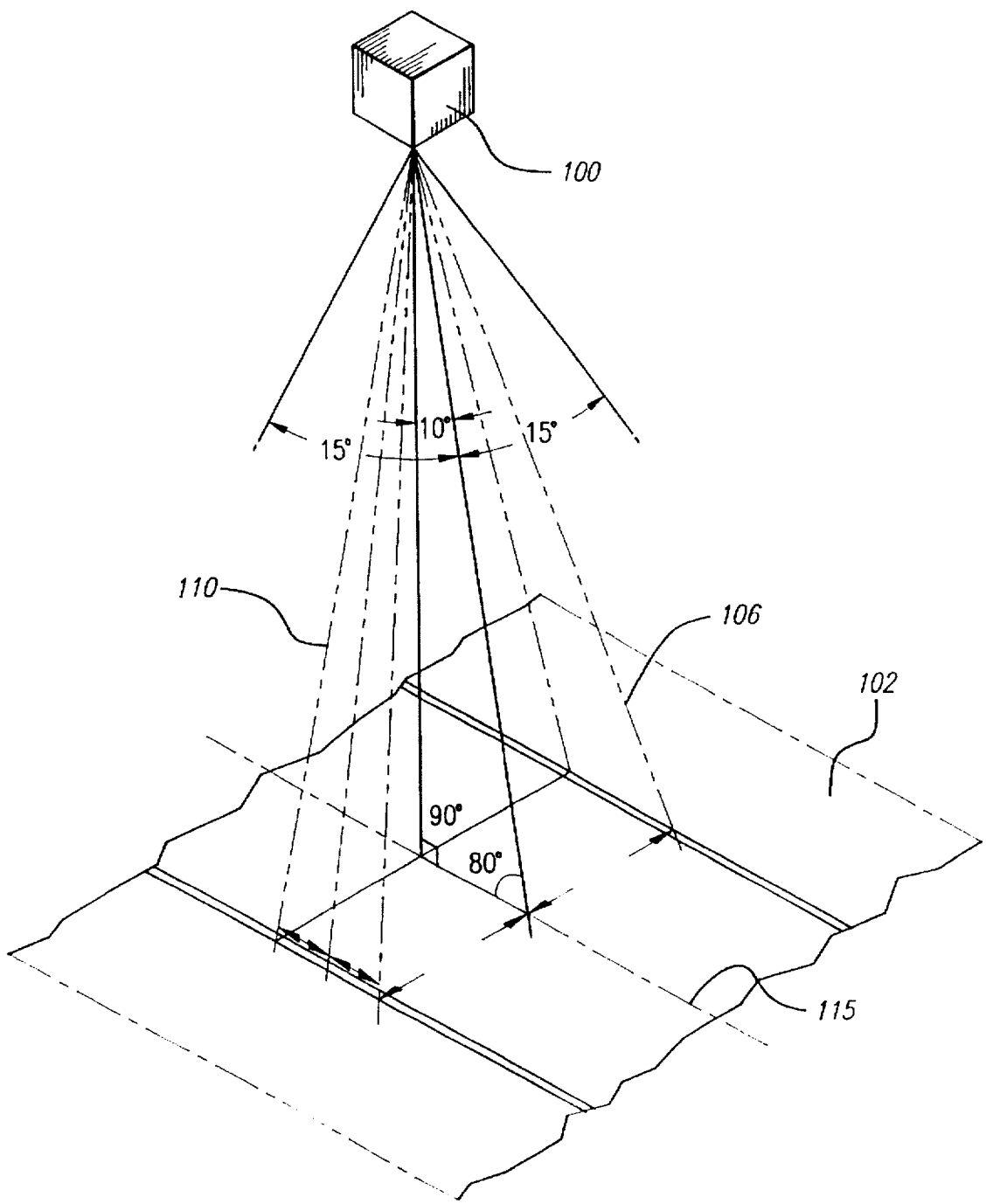
FIG. 2A illustrates an alternate configuration of forward and backward scanning laser beams used in one preferred embodiment of the present invention.
Figure 6:
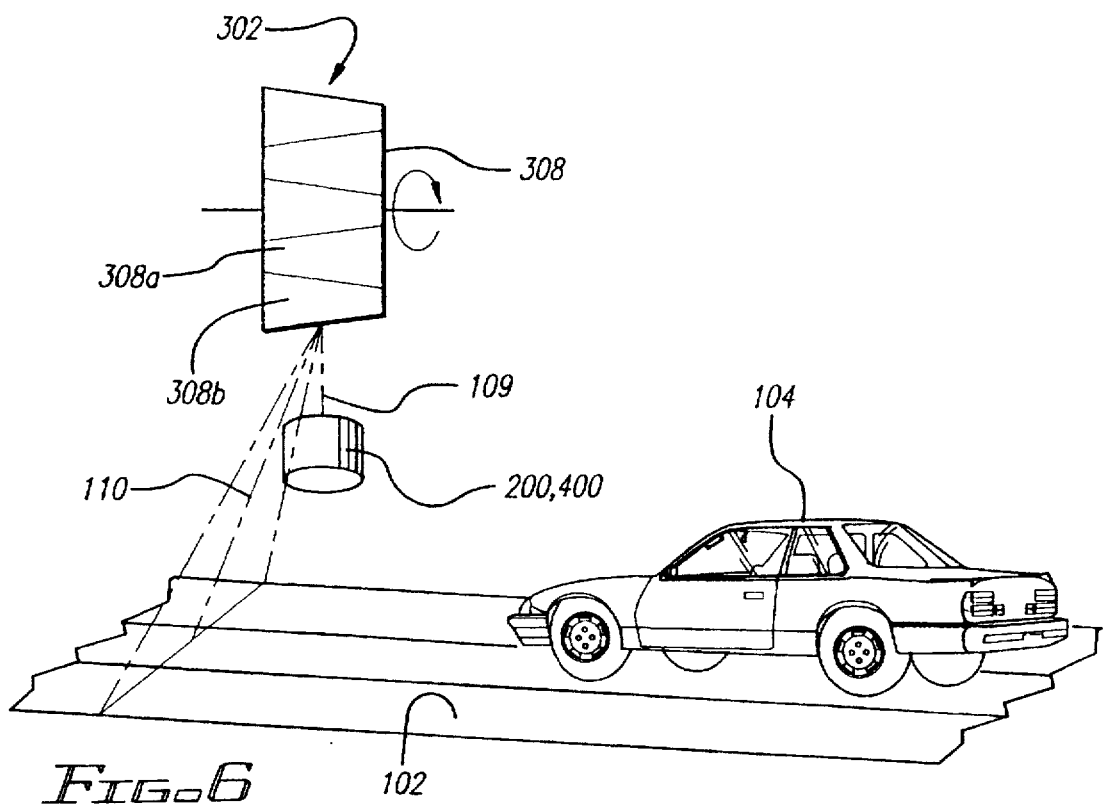
FIGS. 6 and 7 are diagrammatic functional representations of a multi faceted mirror used in one preferred embodiment of the present invention.
Figure 7:
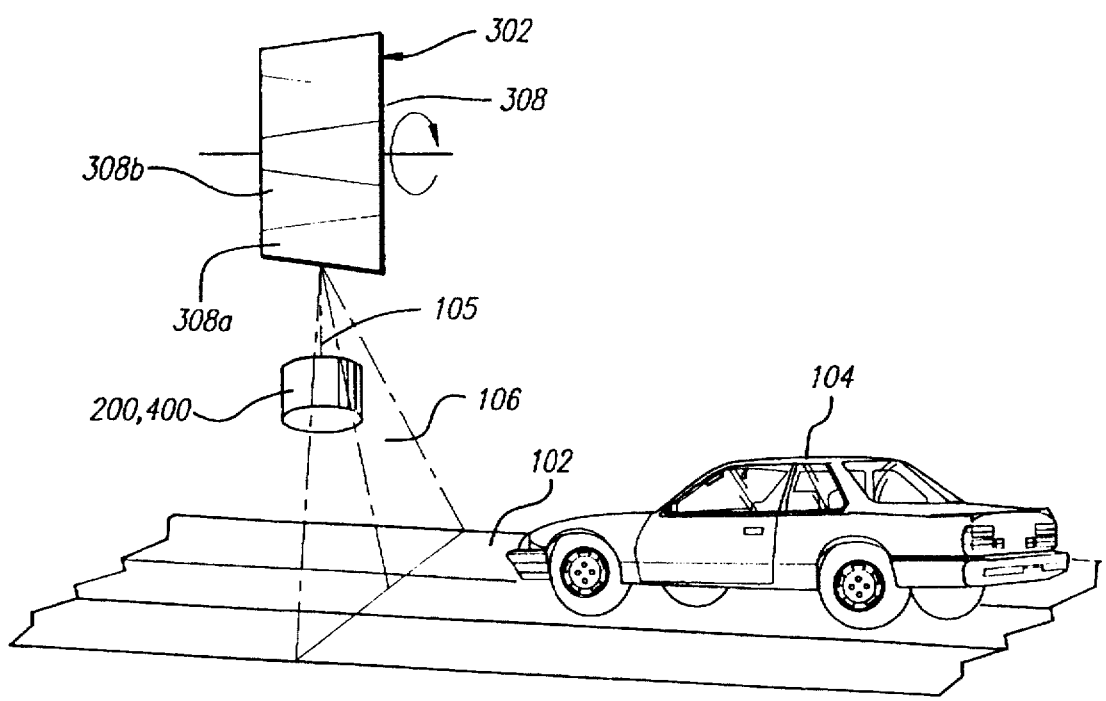

The sensor 100 of a preferred embodiment of the present invention includes a rotating polygon scanner 302 to line scan the laser beams 106, 110 across three 12-foot-wide lanes 114 of a highway 102, as earlier described with reference to FIGS. 1 and 2. The polygon scanner 302 rotates continuously in one direction 304 at a constant speed. In a preferred embodiment of the present invention, herein described herein for coverage of the lanes 114, and as illustrated with reference to FIGS. 5 through 7, as the polygon scanner 302 rotates, the transmitted beams 105, 109, earlier described with reference to FIG. 3, are scanned across a polygon scanner reflective flat facet 308, changing an angle of incidence as the facet 308 is rotated about the scanner axis or rotation 310 for thus providing the beam scan coverage 116. Thus, each transmitter 200 and receiver 400 pair is scanned by the rotating polygon 300 to provide the 30 degree coverage for each, and when sequentially processed, the full 60 degree coverage 116 is achieved.

Figure 5:
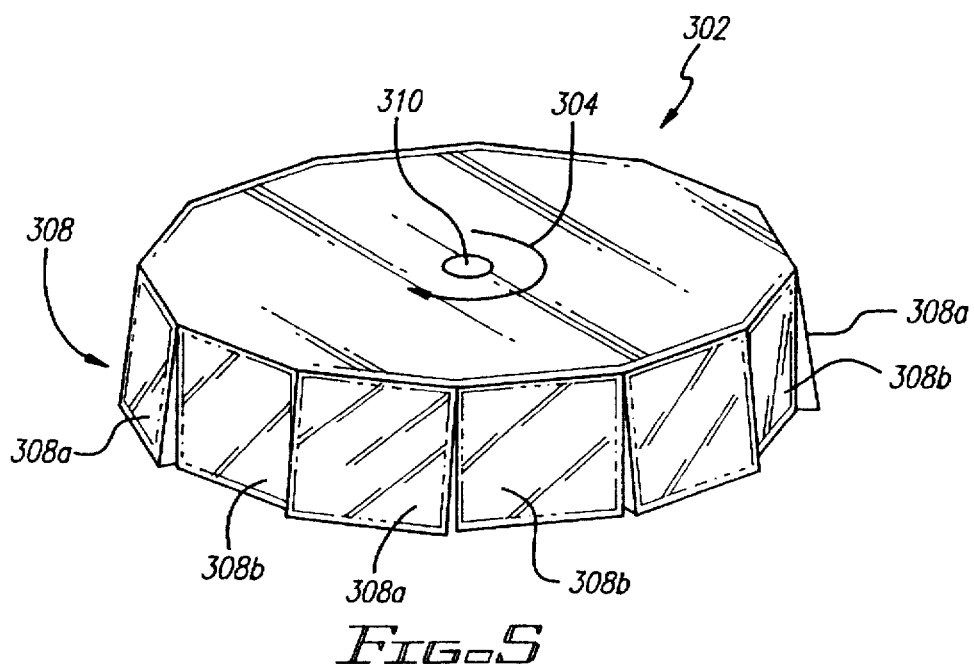
FIG. 5 is a perspective view of the multi faceted mirror of FIG. 4.

As illustrated with reference to FIG. 5, an angular separation 306 between facets 308, by way of example, each adjacent facet 308a, 308b is set at ten degrees. In the embodiment illustrated again with reference to FIGS. 5 through 7, alternating adjacent facets 308a, 308b have angles 309a, 309b to a polygon base 310 which alternates between 87.5° and 92.5° for the adjacent facets 308a, 308b. As a result, successive scans are made with the angular separation 306 of 10 degrees, which provides the two separate forward beam 106 and backward beam 110 used in the vehicle speed measurements. It should be understood that when laser beam scanning is discussed, the laser beam receiver 400 has a field-of-view also scanning since the laser beam axis and receiver field-of-view are aligned and therefore the returned reflected beam herein illustrated is collinear.

Figure 8:
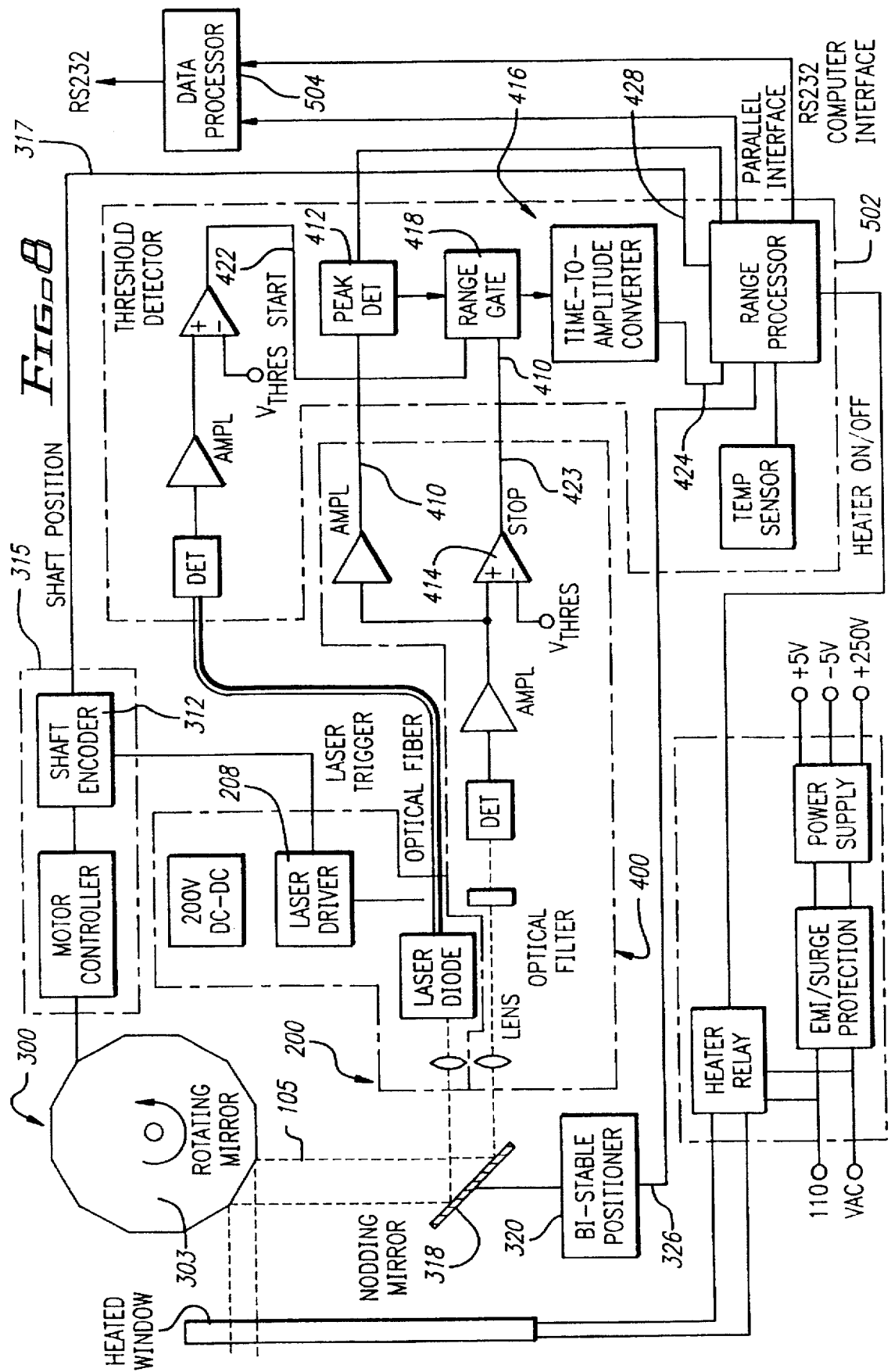
FIG. 8 is a block diagram illustrating the electronics and optics of one embodiment of the present invention.

With one preferred embodiment of the sensor 100 comprising the mirror system 300 having the rotating polygon scanner 302 described with reference to FIG. 5, the range processor 502 described with reference to FIGS. 3 and 8, keeps track of the scanner 302 position using incremental readings from the shaft encoder 312 within mirror electronics 315 of the sensor 100. Therefore, the facets 308 and beam angle 138, as illustrated again with reference to FIG. 1, at which a range measurement is being taken is known and a representative signal 317 is provided to the range processor 502, as illustrated again with reference to FIG. 8. The shaft encoder 312 triggers the laser driver 208 with a first set of consecutive pulses which provide the scanned beam 106 at a predefined angle and will be offset by another set of consecutive pulses resulting from the rotating scanner 302 and reflections from its facets 308 and the discontinuities between facets 308. Again with reference to FIG. 8, the sensor 100 as herein described, comprises dual transmitters 200 and receivers 400, as illustrated and described with reference to FIGS. 3 and 4. As will be later described, alternate embodiments of the mirror system 300 include the use of nodding mirrors 318 and positioner 320 described with reference to FIG. 8 herein and in above referenced application.

In addition, to optimize the size of the sensor housing 122, as illustrated again with reference to FIGS. 3 and 4, folding mirrors 303 are used to redirect beams from each transmitter 200 and receiver 400 pair to the polygon scanner 302. In an alternate embodiment, the nodding mirror 318 may serve a similar function for directing the beam through the housing window 620, described later with reference to FIG. 16.

As is described in above referenced application issuing as U.S. Pat. No. 5,546,188, and herein again described with reference to FIG. 8 and again with reference to FIG. 3, the optical detection of the reflected beams 106b, 110b includes circuitry which converts optical radiation reflected from the vehicle 104 and highway 102, as earlier described with reference to FIG. 1, to first, an equivalent electrical analog of the input radiation and finally, a logic-level signal. With reference again to FIGS. 3 and 8, the output 410 of each receiver 400 is multiplexed by the microprocessor 500 and is connected to a peak detector 412 that measures the intensity of the reflected pulse. Each receiver 400 also contains a threshold detector 414 which converts the analog return pulse signals to logic-level pulses. The logic-level signals are processed within the range counter logic circuitry 416 to yield analog range data, which is read by the microprocessor 500.

Figure 9:
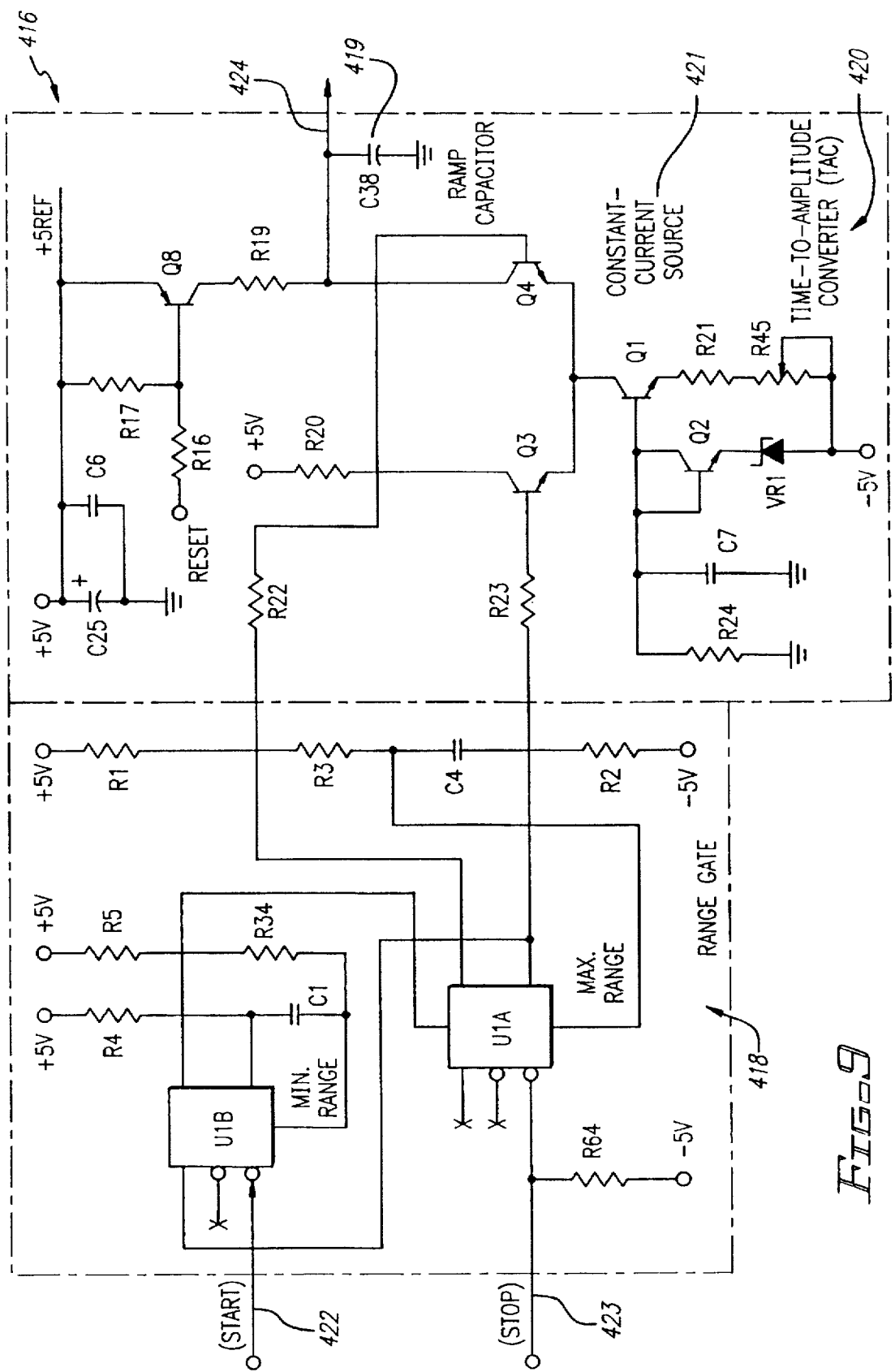
FIG. 9 a schematic diagram of the time to amplitude (TAC) and logic circuitry used in the sensor of the present invention.

While it is appreciated by those skilled in the art that both digital and analog techniques may be used for making the time interval measurement in order to accurately measure the propagation time of the laser pulse to the target and back to the receiver, the analog technique was chosen in earlier embodiments as well as a preferred embodiment of the present invention because of its better resolution, smaller size, simpler circuitry, lower power consumption and lower costs when compared with the digital technique. The analog range measurement technique specifically used in the present invention is known as a "time-of-flight converter" and has an accuracy of about one percent of measured range and a resolution of about plus or minus five centimeters. As illustrated with reference to FIG. 9, the logic circuit 416 comprises range gate 418 and time-to-amplitude converter (TAC) circuit 420 which uses a constant current source 421 including transistor Q1 to charge a ramp capacitor C38, identified with numeral 422, to obtain a linear voltage ramp whose instantaneous value is a measure of elapsed time. The TAC circuit 420 is designed so that the voltage across the capacitor C38 422 begins ramping down from the positive power supply when the transmitter 200 fires to provide a start signal 422, illustrated again with reference to FIG. 8. The ramp is stopped when either a reflected pulse is received by the receiver 400 to provide a stop signal 423 or at the end of a measured period of time. A maximum range and thus a maximum measured time period is preselected as an initial value. The output of the TAC circuit output 424 is then converted to a digital format by a ten bit analog-to-digital converter within the microprocessor 500.

The timing pulse start signal 422 for the TAC circuit 420 is generated by a shaft encoder 312 with a simultaneous pulse causing the laser transmitter 200 to fire.

Such pulsed time-of-flight range measurements using the TAC circuit 420 provide accurate (typically within 3 in.) transverse height profiles of the vehicle 104 on each scan. The vehicle speed, determined from the time interval between the interceptions of the two laser beams 106, 110, as earlier described with reference to FIGS. 1, 6 and 7, by the vehicle 104, is used to space, with a scan separation distance 124, transverse profiles 126 appropriately to obtain a full three-dimensional vehicle profile 128, as illustrated with reference to FIG. 10. An algorithm, as will be described in further detail later in this section, is applied to the three-dimensional profile 128 for vehicle-classification purposes.

One preferred embodiment of the present invention includes two microprocessors 500, a range processor 502 and a data processor 504, as illustrated again with reference to FIG. 3. The range processor 502 triggers the transmitter 200 as earlier described, reads the real-time range and intensity data, provided by the peak detector 412 and TAC circuit 420, as earlier described, and runs continuous self test and calibration functions. The data processor 504 runs all the algorithms for vehicle classification, calculates certain traffic parameters, and controls all communications ports, for example an RS232 output.

Figure 11:
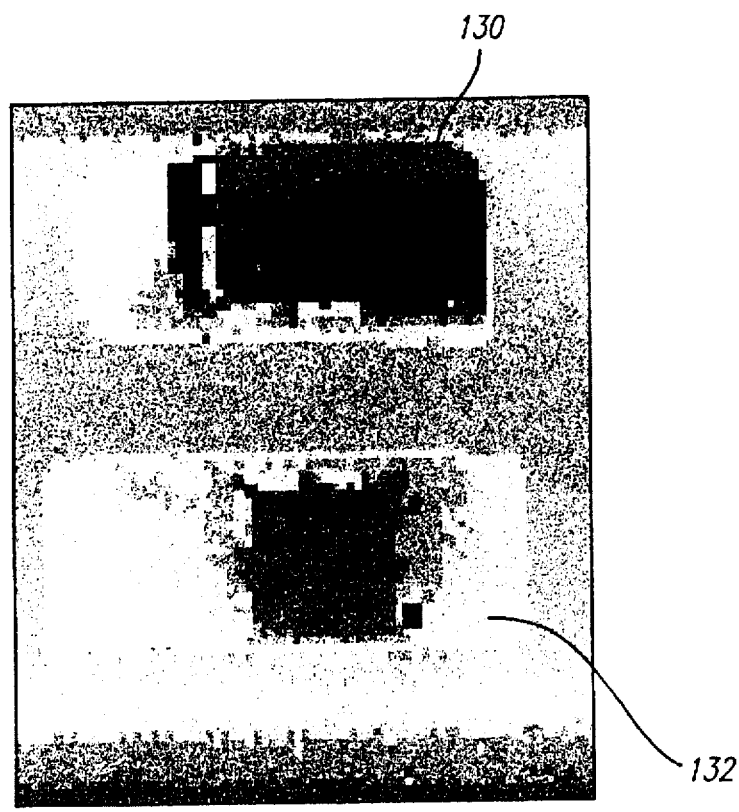
FIG. 11 is a pen and ink reproduction of a false color range image illustrating vehicle profiles for detected vehicles.

An example of three-dimensional profiling capability for multiple vehicles is provided by the range images shown in FIG. 11. This range image of a van 130 traveling next to a pickup truck 132 traveling at a speed of about 45 mph demonstrates the ability of the sensor 100 to distinguish between vehicles 104. The pixel spacing resulting from a 0.67 degree scan resolution is more than adequate for vehicle separation.

When the vehicles 104 are present beneath the sensor 100, as illustrated again with reference to FIGS. 1 and 2, the distance to a top surface of the vehicle 104 will be measured. As illustrated again with reference to FIG. 10, these measured distances at various scan angles, earlier described with reference to FIG. 1, are used to generate the vehicle profile 128 (height above the highway 102) by straightforward geometric transformation. If the vehicle 104 is stationary, the laser beam 106, by way of example, will continuously scan across it along the same line. If the vehicle 104 is moving, the scans will be separated by the scan separation distance 124 determined by the vehicle speed and the scan repetition rate. The scan separation distance 124 scan separation distance is ds=V/SR where V is the speed of the vehicle and SR is the scan rate (scan per second). The 12-sided polygonal mirror 302, illustrated again with reference to FIGS. 3 and 5, rotates at 3600 rpm and as earlier described, has every other facet 308 tilted, which results in a scan rate of:

SR=(3600/60)×6=360 scans/sec/scanline

By way of example, for a vehicle speed of 100 mph, the separation distances 124 for consecutive profiles are less that 5.0 inches, and for 50 mph the separation distance 124 is less than 2.5 inches. Using the consecutive cross-lane profiles, the three-dimensional images 128, 130, 132, with reference again to FIGS. 10 and 11 are constructed. At 100 mph, the scanner produces 72 scans across a 15-foot-long vehicle. With each scan containing 30 range measurements, there are at least one thousand to two thousand range measurements (depending on vehicle width) at 100 mph, by way of example. This high scan rate combined with full lane coverage, narrow laser beam width and 3" range accuracy makes it difficult for a vehicle to pass through the sensing area 108 undetected. Even closely-spaced vehicles (by way of example within 1–2 ft) traveling at 100 mph are easily separated.

As illustrated again with reference to FIGS. 1 and 10, a vehicle length (I) 135 is calculated by measuring the vehicle speed (v) and multiplying it by the total number of scan lines (sl) or transverse profiles 126 detected on the vehicle 104 and the scan-to-scan time (st) using l=v×sl×st Since the scan-to-scan time of the scanner is measured with ±1 us accuracy by a controller 314 for the rotating polygon scanner 302, the length accuracy will have the same speed-dependent accuracy as the speed.

The sensor 100 is capable of classifying vehicles such as a motorcycle, automobile, pickup truck, bus, and commercial trucks. This list can also be expanded by breaking a vehicle class into subcategories. For instance, the subclassification categories can be generated to separate pickup trucks from vans or sport utility vehicles.

Each sensor 100 provides both an RS-232 and an RS-422 serial interface 506 for connection to other equipment. The RS-232 interface operates at data rates up to 19.2 kilobits per second and is primarily used to connect the sensor to spread-spectrum radio links or other types of data modems. Hard-wired installation of the sensors 100 is better served by the RS-422 interface. With this port, data rates of up to 1.0 megabits per second (during test mode) can be supported.

Features of the sensor 100 include, automatically initializes the vehicle detection process upon power up, automatically adjusting for varying conditions at the installation sites, including adjustments for slope, grade, road reflectivity variations, and the presence of barriers and guard rails. Such features and sensor performance are not compromised by vehicles passing through the sensing area 108 or field-of-view.

The continuous self-test capability of the sensor 100 provides instant fault isolation. Every major circuit in the sensor is continuously tested for proper operation. The moment any self-test fails, a Self-Test Message will be transmitted from the unit so that immediate action can be taken if necessary.

Figure 10:
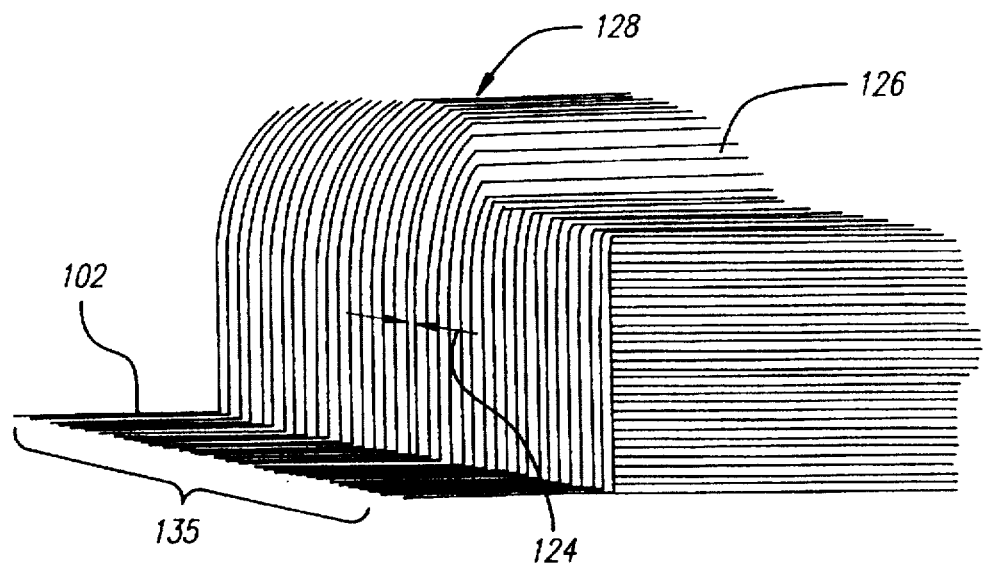
FIG. 10 is a perspective view illustrating a three dimensional vehicle profile provided by the present invention.
Figure 12A:
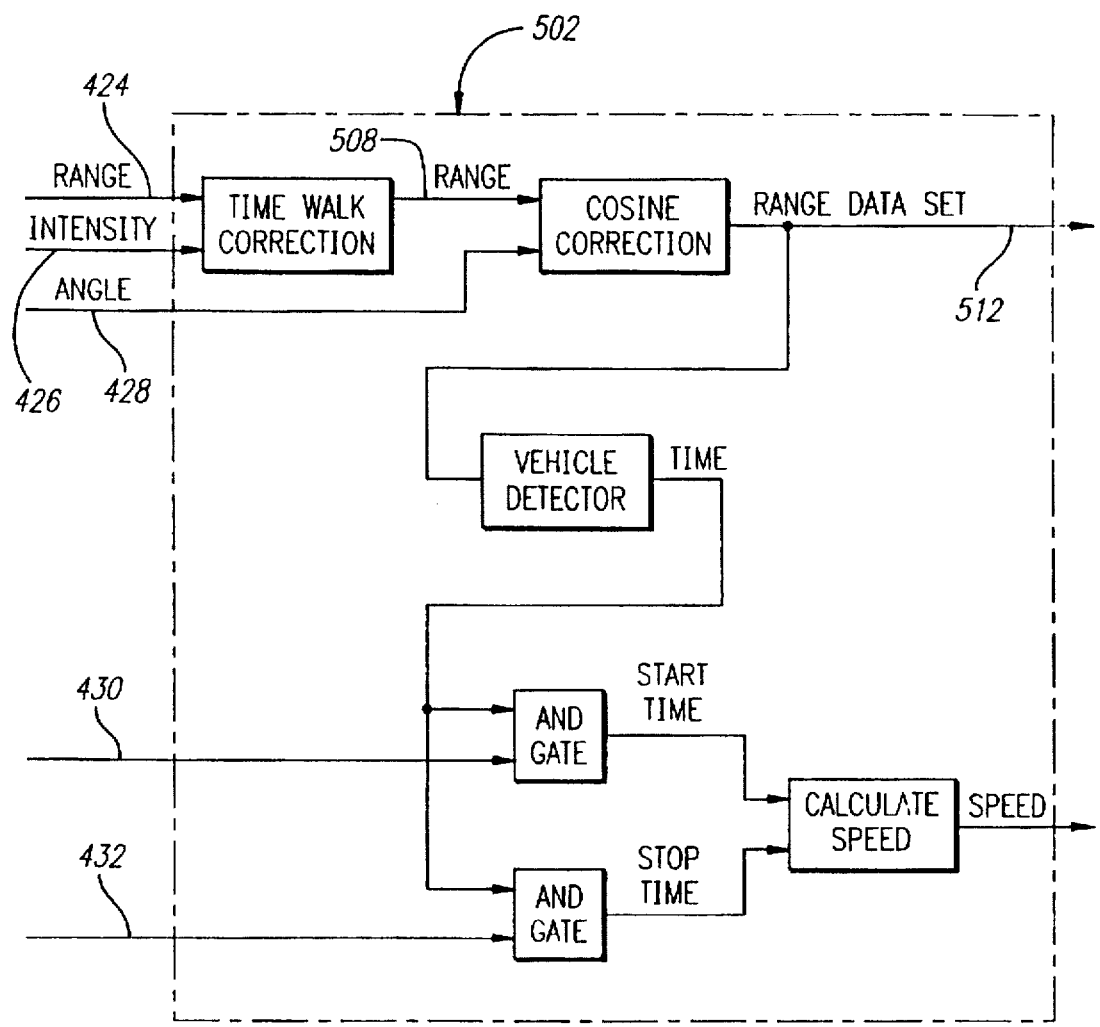
FIGS. 12A and 12B are block diagrams illustrating a functional flow of the processor used for the present invention.
Figure 12B:
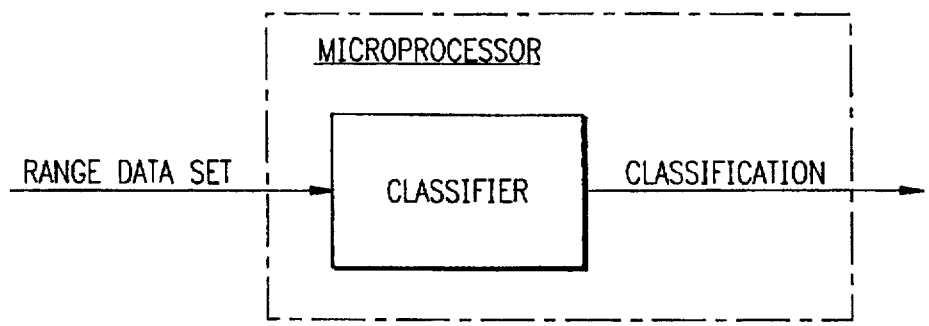
Figure 13A:
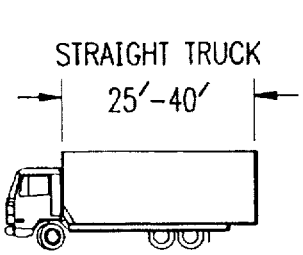
FIGS. 13A through 13J illustrate "American Truck Association Truck Types" by way of example, for use in toll road vehicle data collection and classification.
Figure 13B:
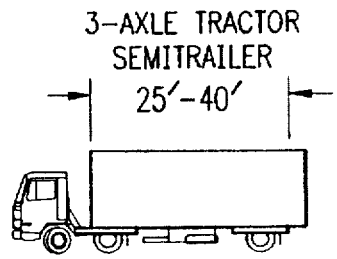
Figure 13C:
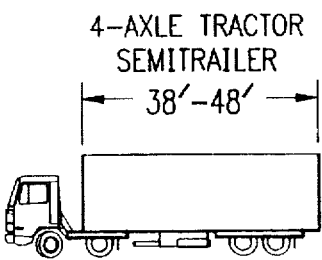
Figure 13D:
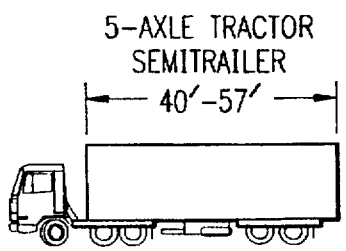
Figure 13E:
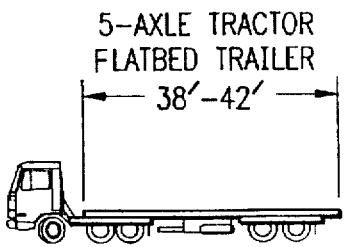
Figure 13F:
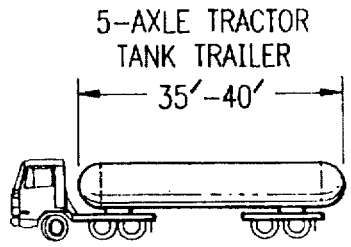
Figure 13G:
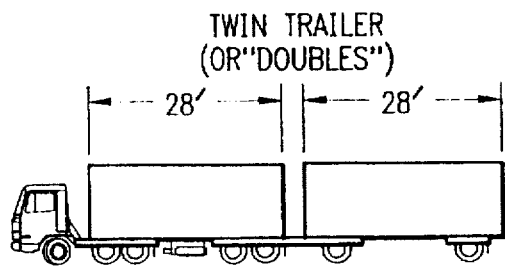
Figure 13H:
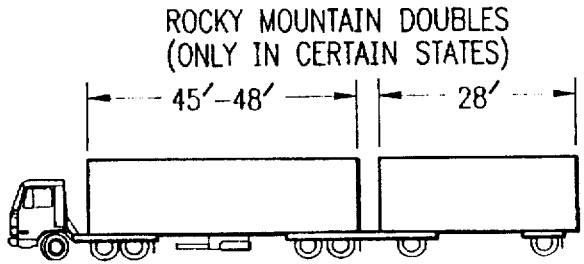
Figure 13I:
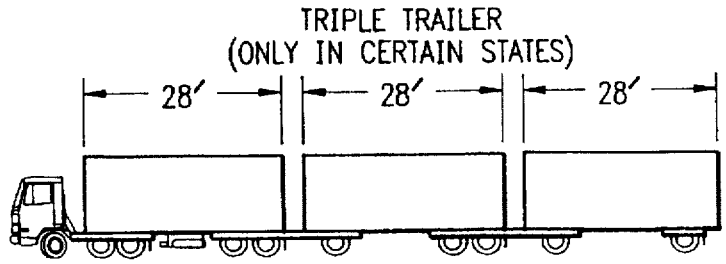
Figure 13J:
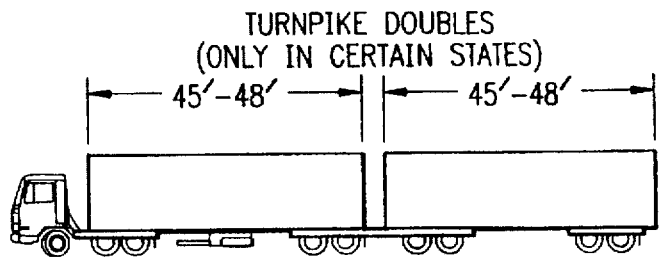

Testing of the sensor 100 has determined a detection accuracy of 99.9%, speed accuracy of +/−3.5 mph @ 60 mph, and a classification accuracy of 98% for 5 classes. The increased lane coverage of the sensor 100 herein described with reference to FIG. 3, results in a reduction in the number of sensors needed for larger roadway configurations. Mounting variations could utilize the sensor 100 for coverage of additional lanes other than the three herein described, by way of example with reference to FIG. 2. To provide a thorough and complete disclosure and fully convey the scope of the present invention, its improvements with regard to earlier disclose embodiments, consider the following, again with reference to FIG. 3 and with reference to FIGS. 12A and 12B, the microprocessor 500 receives range information through the TAC output signal 424 and return pulse intensity signal 426, as described earlier. In addition, time walk corrections are performed for accounting for range measurement error and for providing a corrected range signal 508 used with a respective angle signal 428 provided by the shaft encoder 312, earlier described with reference to FIG. 8, for providing a cosine correction 510 in the scanning plane and results in a range data set 512 representative of a sensed surface such as the detection points 136 on the vehicle 104, as described earlier with reference to FIG. 1. This range data set 512 is then processed in the data processor 504 for classification with known vehicles. As earlier described, the forward and backward beams 106, 110 are distinguished and corresponding forward scan 430 and backward scan 432 signals are input to the microprocessor 500 for use in time calculations to determine the vehicle speed. In this way, the three dimensional vehicle profile illustrated in FIG. 10 is constructed with reference to the highway 102. Profiles 128 are matched against database profiles in the data processor 504. Predetermined rules for comparison are used that will include, by way of example, total vehicle surface area, vehicle height above the roadway, and other distinguishing database vehicle characteristics effective in classifying the vehicles. Once the rules are established, general rule base algorithms are used in completing the classification. With reference to FIGS. 13A through 13J, the complexity of the classification can be appreciated by examining the truck types established by the American Trucking Association as one example. It is anticipated that multiple sensors 100 will be used to provide classification in certain situations where additional detail for a vehicle or multiple vehicles in multiple lanes is required. By way of example, a reconstructed three dimensional profile of a truck, by way of example, is illustrated with reference to FIG. 13K, for a typical image as viewed on a video monitor screen.

Figure 14:
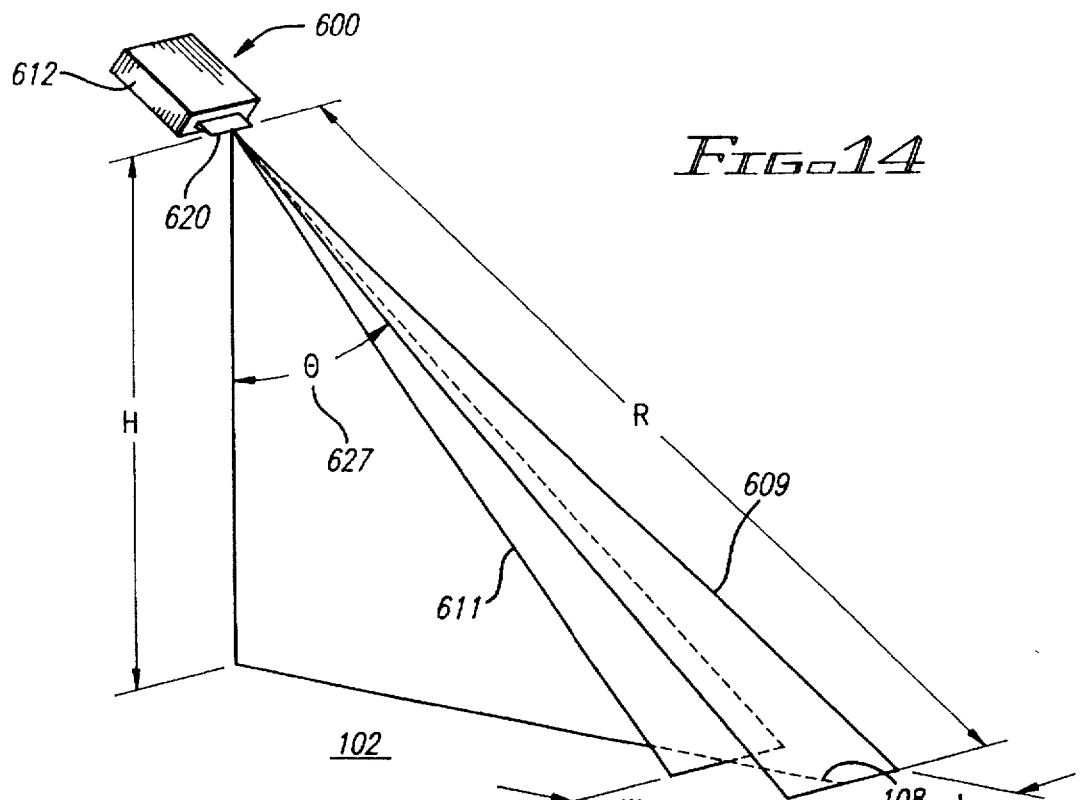
FIGS. 14 and 15 are perspective views illustrating the operation of the active near-field object sensor.
Figure 15:
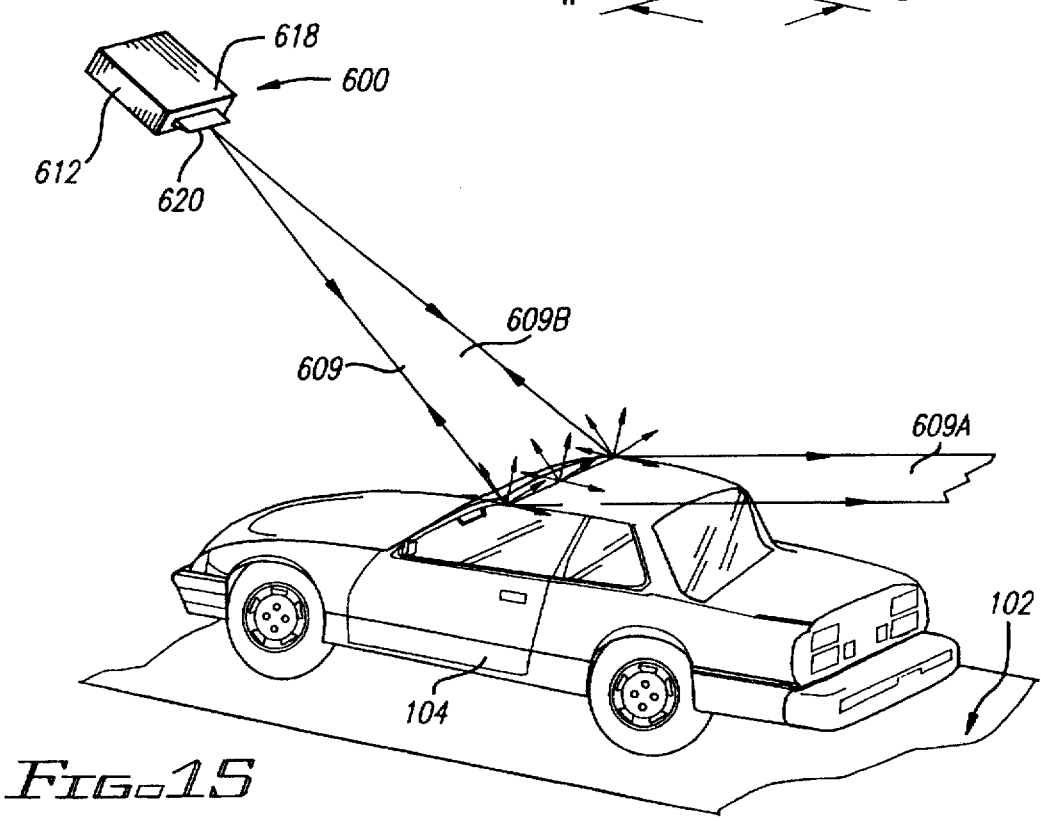

As earlier discussed, disclosure of a sensor 600, as illustrated with reference to FIGS. 14–16, will further support disclosure of the improved sensor 100 and provide an appreciation of sensor history. In addition, features found to support improved sensor operation are included for the sensor 100. The sensor 600, in accordance with disclosure of the referenced co-pending invention comprises a compact enclosure 612 of light-weight material, such as aluminum. Across one side of the enclosure 612 is a transmissive window 620, which is shielded from ambient weather by a hood 618.

Figure 16:
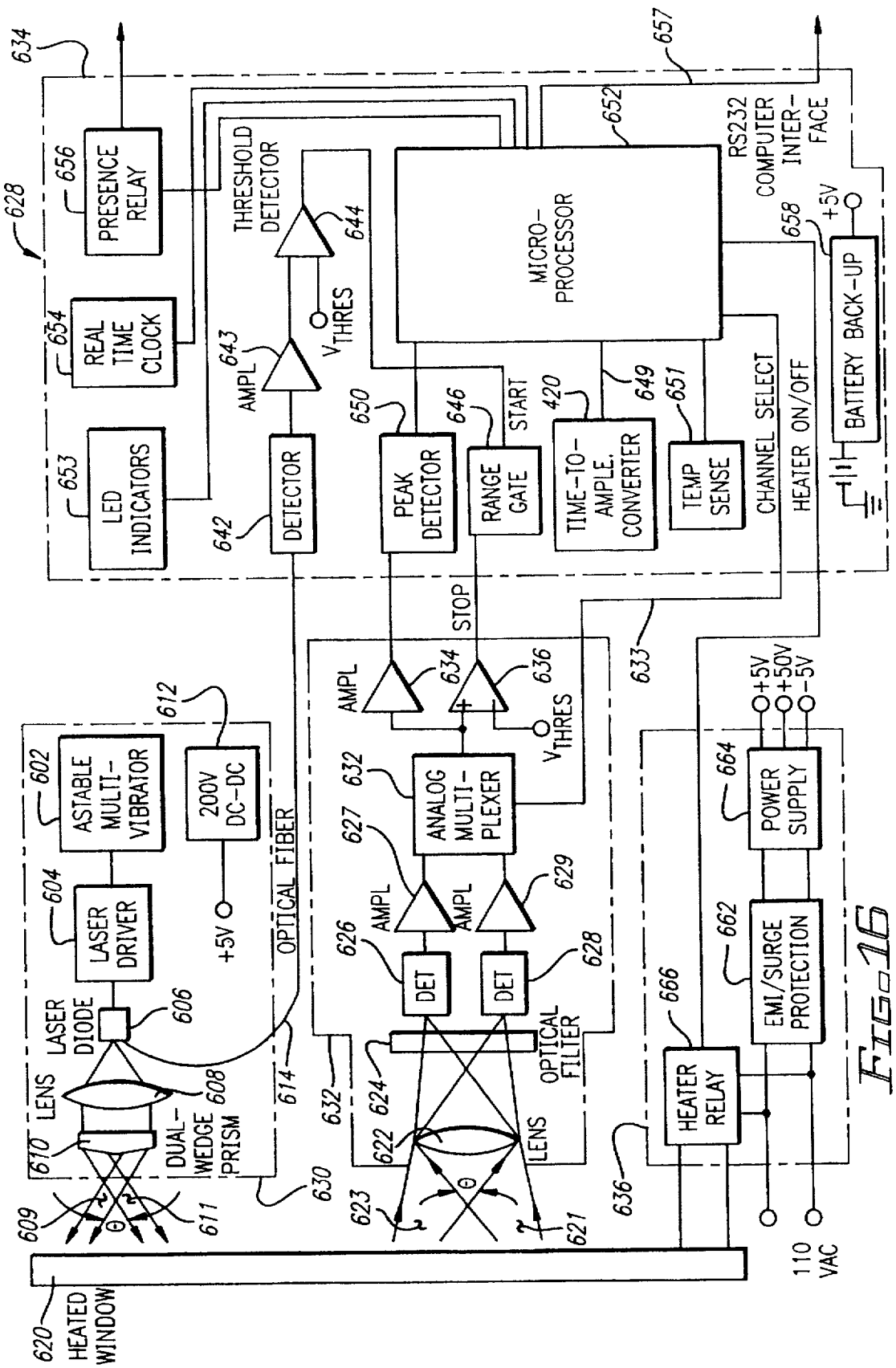
FIG. 16 is a block diagram illustrating the electronics and optics of an alternate embodiment of sensor illustrated in FIGS. 14 and 15.

An electro-optical assembly fitted within the enclosure 612 is depicted in a block diagram format with reference to FIG. 16 and referred to there generally by the reference numeral 628. The electrical-optical assembly 628 includes a transmitter section 630, a receiver section 632, a range/processor section 634, and a power supply 636, each of which is discussed in detail in application Ser. No. 07/980, 273 issuing as U.S. Pat. No. 5,321,490 and highlighted below.

The transmitter section 630 includes an astable multivibrator 602 generating a laser trigger pulse at a nominal repetition frequency of 3 kilohertz to a laser driver 604 which, by way of example, produces a 20 ampere peak current pulse with a 4 nanosecond rise time, and a ten nanosecond pulse width. The output of the laser driver controls a laser diode 606, which preferably comprises an indium gallium arsenide injection laser diode array having an output on the order of 180 watts, at the 20 ampere pulse current defined by the driver 604. This diode emits an output at 904 nanometers, which has been found to be an ideal wavelength for the silicon photodiode receiver, discussed below. It is also preferred that the array of the laser diode 606 have a junction characterized by dimensions of about 3.96 millimeters by 0.002 millimeters, in order to emit radiation in a 10 degree by 40 degree solid angle.

The output of the laser diode array 606 is collected by a fast (F/1.6) multi-element optical lens 608 which has an effective focal length of 24 millimeters and which is used to collimate the diode laser emission, the resulting collimated beam passes through a dual-wedge prism 610. By way of example, the resulting beam has a divergence of 3.96/24= 165 mrad parallel to the diode junction and 0.002/24=0.083 mrad perpendicular to the diode junction. The two outputs of the dual-wedge prism 610 are referred to by reference numerals 609 and 611. Both outputs are passed through the heated transmissive window 620.

In order to generate the high voltage necessary to pulse the laser diode 606, a 200 volt DC—DC converter 612 is provided in the transmitter section 630 and preferably is contained within the aluminum enclosure 612, earlier described with reference to FIGS. 14 and 15, for reducing electrical interference.

The transmitter section 630 further includes an optical fiber 614 coupled to receive a simultaneous output from the laser diode 606 with the emission into the lens 608. The output passing through the optical fiber 614 provides a significant aspect of the sensor 600, as is discussed in greater detail with reference to the range/processor section 634.

The receiver section 632 includes lens 622 for receiving reflected returning energy from the two pulsed output beams 609 and 611 emitted by the transmitter section 630. The energy passing through the lens 622 is passed through an optical filter 624, and the single input from the lens 622-filter 624 is fed into two photodetectors 626, 628 each of which provides an input to a respective amplifier 627 and 629 both of which provide an input to an analog multiplexer 632. The sensor 600 performs an optical multiplexing. The optical energy received in the lens 622 is first converted into an equivalent electronic analog of the input radiation and second into a logic-level signal. The outputs of the two photodetectors 626 and 628 are time-multiplexed by the high-speed analog multiplexer 632, which is controlled by a logic-level control line 633 from the microprocessor 652 contained within the range/processor section 334. The output of the multiplexer 632 is connected to a threshold detector 636 and an amplifier 634, both of which provide inputs to the range/processor section, as described below.

In one preferred configuration, the two photodetectors 626 and 628 are silicon photodiodes which operate as current sources, with the associated amplifiers 627 and 629 converting the current pulses of the photo detectors 626 and 628 into voltage pulses. Each amplifier 627 and 629 offers a transimpedance of 28 kilohms when operated in a differential mode.

The optical filter 624 preferably has a narrow-band (on the order of 40 nanometers) width, which limits the solar radiance and permits only the 904 nanometer radiation to reach the photodetectors 626 and 628. Typically, the transmission of the narrow-band filter 624 is on the order of about 75 percent at 904 nanometers.

It is preferred that the analog portion of the receiver section 632 be contained within a Faraday shield (not shown) which permits the circuit to operate in a "field-free" region where the gain is achieved without additional noise reduction.

The range/processor section 634 includes a detector 642 optically coupled with the fiber 614, an amplifier 643 and a threshold detector 644, the output of which represents a "start" input to a range gate 646. The "stop" input for the range gate 646 is provided as the output from the threshold detector 636 contained within the receiver section 632.

The specific forms of the range gate 646 and the time-to-amplitude (TAC) converter circuit 420 are shown described in the co-pending applications and described earlier in with reference to FIG. 9. A constant-current source including transistor Q1 is used to charge a ramp capacitor C38 to obtain a linear voltage ramp whose instantaneous value is a measure of elapsed time. The TAC circuit 420 is designed so that the voltage across the capacitor C38 begins ramping down from the positive power supply when the laser diode 606 fires. The ramp is stopped when either a reflected pulse is received at the detectors 626 or 628, or at the end of a measured period of time. Again with reference to FIG. 16, the output 649 of the TAC circuit 420 is then converted to a digital format by an 8 bit analog-to-digital converter inside the microprocessor 652. The start timing pulse for the TAC circuit 420 is produced utilizing the optical detection of the transmitted laser pulse through the fiber 614, which provides an input to the detector 642 and thence to the amplifier 643.

Further referring to FIG. 16, the output of the amplifier 634 from the receiver section 632 is provided as an input to a peak detector 650 which in turn provides an input to the microprocessor 652. This feature is directed to a problem encountered when measuring range-to-vehicles in the low level of return signals from windshield and poorly reflecting black metal or plastic vehicle parts. This low level of return signals frequently results in range readings which are close to those from the street level, and would therefore erroneously indicate that a vehicle was not present. This range measurement error, which is proportional to the magnitude of the variation in return-signal level, is known as "timing walk". This problem is solved by the accurate measurement of the peak of the return signal with the high-speed peak detector circuit 650, and the use of the microprocessor 652 to apply a correction factor to the range measurement based on the return signal level. Thus, a very low level of the signal is in itself an indication of the presence of an object (such as a vehicle) being detected. The sensor will then indicate the presence of the object when either the range reading is shorter than that to the street, or alternatively when the return-signal level is much less than that from the street.

The microprocessor 652, by way of example, comprises an Intel 87C196KC into which the software described below is loaded. As noted in range/processor section 634, the microprocessor 652 provides various outputs to light emitting diode indicators 653, a presence relay 656 for indicating the presence of an object, an RS 232 computer interface 657 and to a heater relay 666 contained within the power supply 336. The microprocessor 652 receives additional inputs from a temperature sensor 651 and a real time clock 654. The range/processor section 634 preferably also includes a battery backup circuit 658.

The power supply section 636 includes an EMI/surge protection circuit 662 for a power supply 664 operated by 110 volt line current. The power supply circuit includes a heater relay 666 controlled by the microprocessor 652, as discussed above, and receiving 110 volts line power. The heater relay is coupled to the window 320, to maintain the temperature of the window 320 constant for varying ambient conditions.

For operation of the sensor 600, in a vehicle-detection configuration reference is again made to FIGS. 14 and 15. The sensor 600 is at a height H above the highway 102, and is displaced at an angle Theta 627 so as to be pointed toward the sensing area 108 defined by the beam separation W and the beam length L, and which is located a range distance R between the sensor 600 and the area 108. In accordance with the discussion above with respect to the electrical-optical assembly 628, the sensor 600 transmits two separate beams 609 and 611 (described as forward beam 106 and backward beam 110 with earlier description of sensor 100 and FIG. 1) which fall upon the area 108 defined by the length L and the width W. As illustrated again with reference to FIG. 15, when the vehicle 104 is positioned within the area 108, by way of example, a portion 609A of the radiated energy in beam 609 will be scattered from the vehicle 104 and away from the sensor 600, while a portion 609B is reflected back toward the sensor 600 for detection by receiver section 632, as earlier described.

As a result of the above description, it is thus understood that the microprocessor 652 using the software and the various inputs from the electrical-optical assembly first measures the range to the road; if the range falls below a predetermined threshold, the microprocessor signals that a vehicle 104 is present by closing the presence relay 656, earlier described with reference to FIG. 16. By way of example, the threshold is determined by calculating the minimum, maximum and average range to the highway 102 for 100 discrete measurements. The maximum error is then calculated by subtracting the average from the maximum range measurement and the minimum from the average range measurement. The threshold is then set to the maximum error. The microprocessor 652 utilizing the software, to a certain degree classifies the vehicle 104 detected (as, for example, an automobile, a truck or a motorcycle) by examining the amount of range change, it being understood that a truck produces a much larger range change than an automobile, and a motorcycle a much smaller range change. The software keeps an accurate count of vehicles by classification for a predetermined period (for example, 24 hours) and in one example maintains a count of vehicle types for each hour of the day in order to provide a user flow rate.

The microprocessor 652 and the associated software also calculates the vehicle speed in the manner described above, by calculating the time each vehicle takes to pass between the two beams 609 and 611. Specifically, the microprocessor 652 utilizes a microsecond time increment, and is reset to zero when the first beam 609 detects the presence of the vehicle 104, and is read when the vehicle 104 is detected by the second beam. The software then automatically calculates the distance between the two beams 609 and 611 by applying the law of cosines to the triangle formed by the two beams and the distance between them at the level of the highway 102, as illustrated again with reference to FIG. 14. The speed is then calculated by taking the distance between the beams and dividing it by the time the vehicle takes to travel that distance.

The sensor 600 can also be utilized to ascertain the existence of poor highway visibility conditions, which is useful in providing a warning to drivers to slow down because of dangerous visibility conditions. The amplitude of the return signal received by the vehicle sensor is proportional to the atmospheric transmittance (visibility). Analysis has shown that the sensor can detect vehicles until heavy fog or rainfall reduces the visibility range to 18 m. Corresponding to the change in visibility from clear day to foggy conditions, the received signal power decreases by a factor of 22. Thus, a measurement of the return-signal amplitude can be used to ascertain the existence of poor highway visibility conditions. If the microprocessor 652 senses a return-signal level from the roadway below a certain preselected threshold, then the software can initiate an output through the interface 657 to an appropriate visibility warning signal.

It has been found that the sensor 100 achieved a detection percentage of 99.4%, and measured speed with an accuracy equal to or greater than that of conventional radar guns used for traffic enforcement purposes. The system also provided two dimensional vehicle range and intensity profiles. It was observed that the vehicles were accurately profiled, even in the area of the windshields where the intensity of the return signal was quite low, demonstrating the efficacy of the intensity-dependent range correction in mitigating the effect of timing walk on range measurements at low return-pulse amplitudes.

Figure 17:
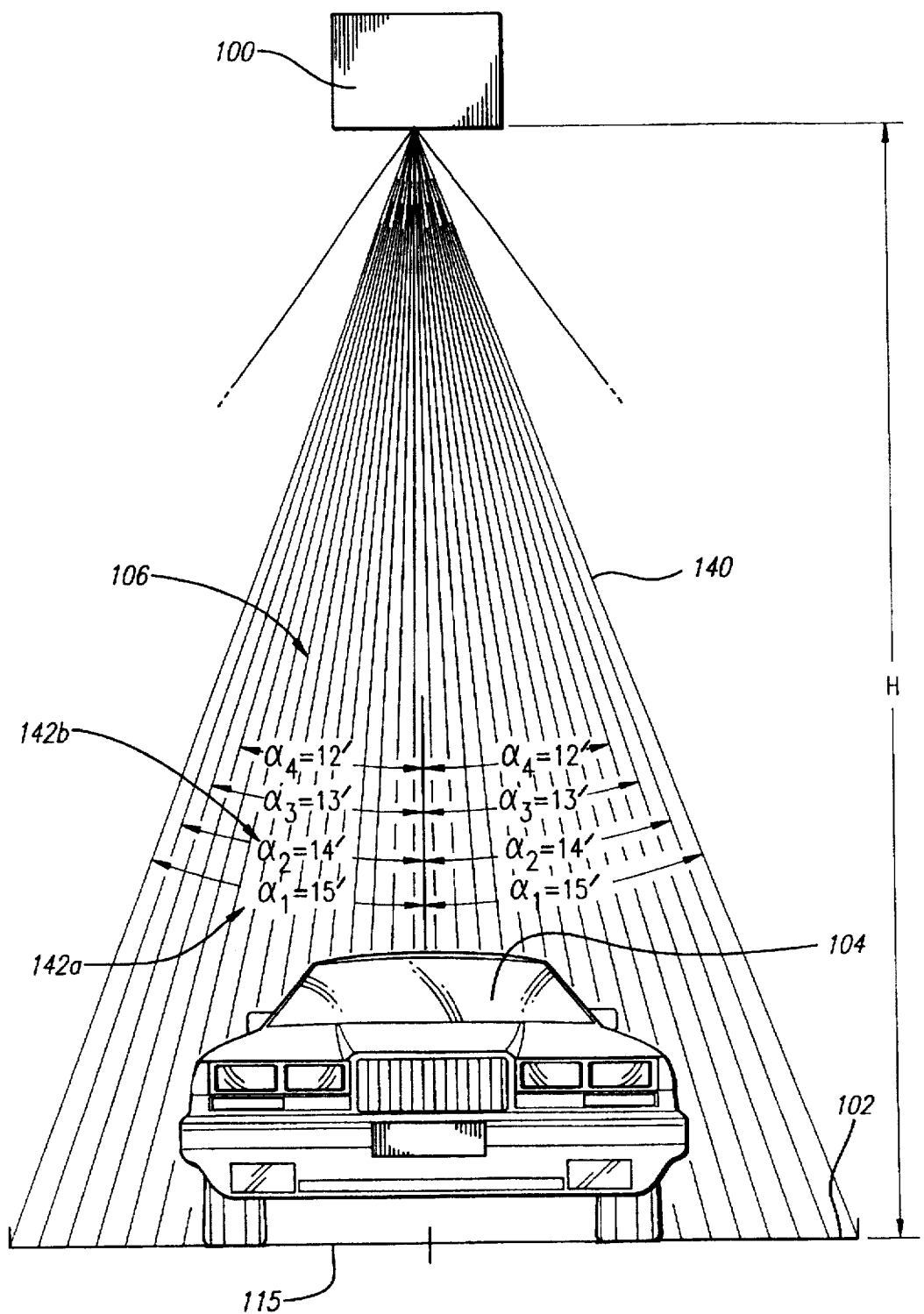
FIG. 17 illustrates a scan geometry for providing high accuracy laser radar with a three inch range resolution for a sensor of the present invention.

Again with reference to FIG. 1, the present invention provides high resolution in both transverse axis (multiple forward cross scans 106 and multiple backward cross scans 110 of the lanes 114) and longitudinal axis (collection of a multiplicity of ranges within the scans 106 and 110 along the vehicle 104 and 104a passing in the lane 22) to provide the three dimensional profile 128, by way of example, of the vehicle 104. This is true whether a single or dual transmitter and receiver sets are used to create the beam scanned coverage 116, earlier described with reference to FIGS. 1 and 2. As described, one preferred embodiment comprises a first transmitter/receiver pair for coverage of a thirty degree beam with a second pair for a second thirty degree coverage, each positioned to provide the complete sixty degree coverage herein described, by way of example. Again with reference to FIG. 17, the sensor 100 is mounted above the highway 102 over the center lane 115, as earlier described, or over a lane of interest depending on the desired use. By way of example, when a single beam 140 is pointed in the direction of a scanned angle alpha 142, the sensor 100 makes a measurement of the highway 102 for that particular angle alpha one, for example, alpha 142a, as illustrated in FIG. 17. When the beam 140 is pointed in the direction alpha two 142b, it makes the next measurement. This continues at regular angle spacing until measurements are completed across the complete traffic lanes, again for a single transmitter/receiver system or the sensor 100, described with reference to FIGS. 1 and 2, for multiple lanes. By way of example, with a total scan angle of 30 degrees, for each transmitter/receiver and one degree between measurements, the maximum separation between measurements on the highway 102 can be calculated as approximately 25 ft (tan 15 degrees—tan 14 degrees)=0.465 ft or 5.6 inches. When the vehicle 104 is present, the distances or ranges to the points 136 on the surface of the vehicle 104 are measured. These ranges 144 or measured distances at the various scan angles 142 are then used in generating the vehicle profile 128 as illustrated in FIG. 10. The profile 128 is formed by generating measured points 136 above the highway 102 by geometric transformation well known in the art.

To continue with the above example, one embodiment comprises a 12 sided mirror 303 rotating so as to provide a scan rate of 720 scan/sec. If the vehicle 104 is traveling at a rate of 100 mph or 146.7 feet/sec, the scan separation distance 124 would be equal to 146.7 ft/sec divided by 720 scans/sec or 2.4 inches. For a vehicle 104 traveling at 50 mph, the separation distance 124 is less than 1.25 inches. Such separation distances 124 provide detail sufficient to provide a three dimensional profile for accurately classifying the vehicle 104.

As illustrated again with reference to FIG. 1, the sensor 100 has the forward beam 16 tilted at 5 degrees toward oncoming traffic and the backward beam tilted at 5 degrees away from oncoming traffic traveling in the lane 22. As described earlier, the laser beam transmitter 200 is triggered at each one degree (angle alpha 142) increment of the 30 degree scan portion of the complete scanned beams 106, 110. ;0 Again with reference to FIG. 1, a vehicle 104 will intercept the forward scanned beam 106 and then the vehicle 104a will intercept the backward scanned beam 110 and the time between interceptions is calculated. The distance between the forward 106 and backward 110 beams on the highway 102 is equal to 2×25×tan 5 degrees or 4.37 feet. At 100 mph and a scan rate of 720 scans/sec as discussed in the example considered, there are 21.47 scans between the interception of the two scanned beams 106 and 110. Using timing signals from the generated laser pulses, as described earlier with reference to FIG. 8, the maximum timing error possible is one scan period and does not exceed 5% at 100 mph and 2.5% at 50 mph. The length measurement accuracy of the vehicle profile 128 is a function of speed and is therefore within 5% when the vehicle 104 is traveling at 100 mph and improves linearly as the speed decreases.

Figure 18:
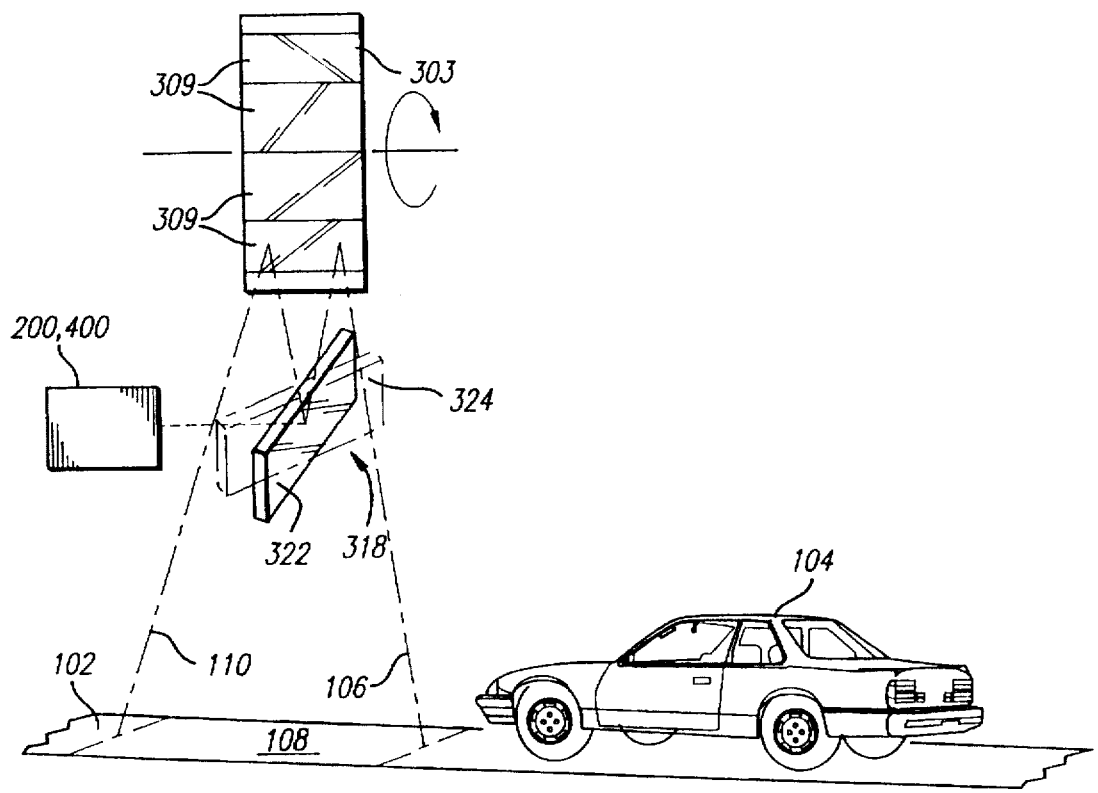
FIG. 18 illustrates the use of a rotating twelve sided polygon mirror to scan a beam and a dual-position nodding mirror deflecting the beam onto alternate rotating mirror facets to reflect the beam into forward and backward scanned beams.

Yet another embodiment for providing the forward 106 and backward 110 scanned beams is illustrated in FIG. 18 and again with reference to FIG. 8, and comprises the use of the nodding mirror 318 which changes from a first position 322 to a second position 324 to reflect the transmitted laser beams 105, illustrated again with reference to FIGS. 3 and 8, as well as a corresponding returning reflected beam, off of facets 309 of the rotating polygon shaped mirror 303 having the facets 309 at the same inclination unlike the angled mirror facets 308 described earlier. As further illustrated with reference to FIG. 8, the bi-stable positioner 320 directs the nodding mirror 318 into its first 322 and second 324 positions. In the mirror system 300 embodiment illustrated in FIG. 8, a twelve sided polygon is used for the rotating mirror 303. In this embodiment, the processor 502 provides a signal 326 to the bi-stable positioner 320 which moves the nodding mirror 318 onto every other mirror facet 309. As discussed, the functional flow of the electronics generally follows that as herein described. It will be appreciated that the sensor 100 of present invention includes an optical/mechanical multiplexing with the use of the nodding mirror 318, by way of example, rather than the analog multiplexing described with reference to the earlier developed sensor 600.

Figure 19:
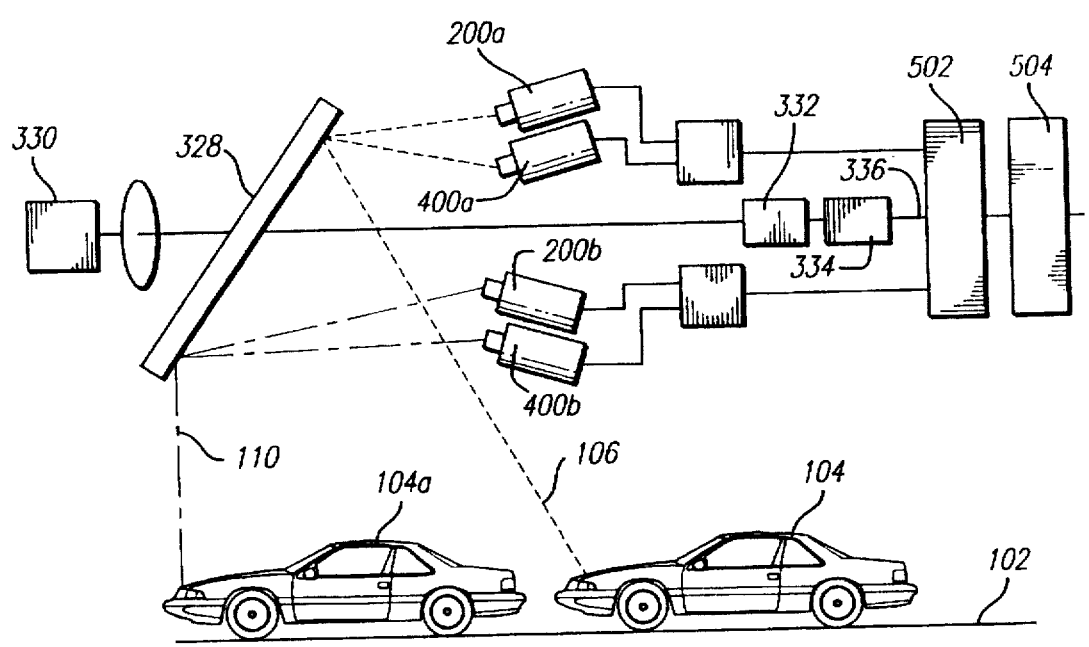
FIG. 19 is a schematic diagram of an embodiment of the present invention using two transmitters and two receivers for forming the forward and backward scanned beams.
Figure 20:
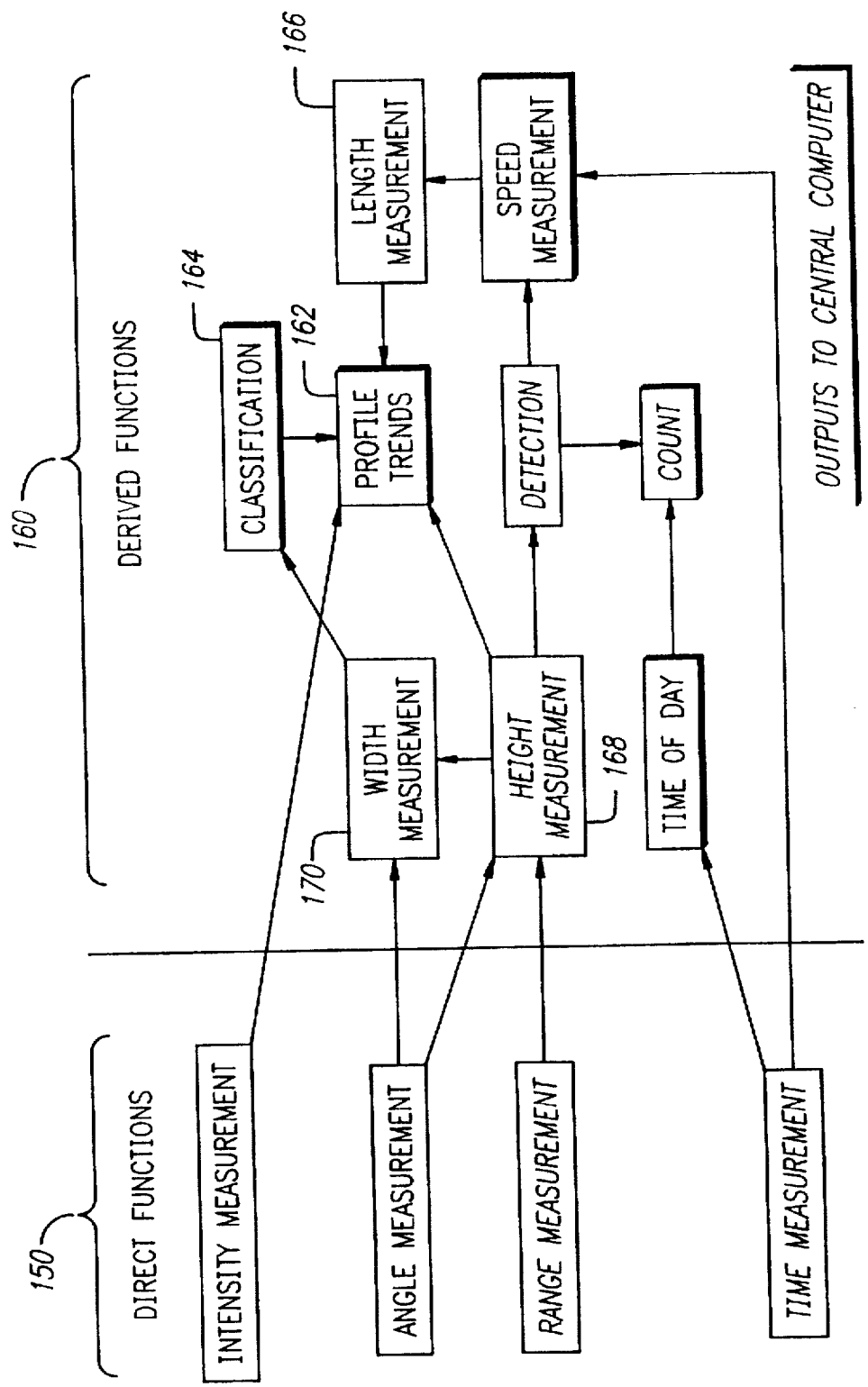
FIG. 20 is a functional block diagram illustrating direct and indirect sensor functions.

In yet another embodiment of the present invention, and as illustrated with reference to FIG. 19, forward 106 and backward 110 scam beams are provided using two laser transmitters 200a and 200b as well as two receivers 400a and 400b as illustrated in FIG. 19. It will be obvious to one of skill in the art, that the electronics of such an embodiment can be as earlier described with reference to sensor 100. In the embodiment illustrated with reference to FIG. 19, a planar mirror 328 is rotated by a motor 330 whose revolutions are monitored by an encoder 332 and counter 334 for providing angle data signals 336 to the processor 502. As functionally illustrated again with reference to FIG. 19, the forward beam 106 and backward beam 110 are positioned at predetermined angles as described earlier by directing the transmitter/receiver pairs at appropriate angles. The rotating mirror 328 scans through a full cycle but only data applicable to the scanned beam positions of interest will be processed.

Before considering an appropriate software for the sensors herein described, consider an allocation of measurements taken by the sensor 100 and measurements derived by the sensor 100, as direct functions 150 and derived functions 160, respectively. To summarize and highlight operation of the sensor 100, consider that a "profiler" compares consecutive range samples and records the profile trends 162. Three trends are recognized: rising edges, falling edges, and plateaus, which are defined as a minimum number of consecutive samples at the same range. To reduce the number of trends in the profile, the range resolution is reduced to 1 foot such that all ranges are rounded-off to the nearest foot. The profiler builds a data structure that contains the profile trends. Each record in the data structure contains the trend type, the length of the trend, and the height of the trend. The data structure is then used by the vehicle classifier 164 to calculate the classification features. The profile trends 162 are also output to the central processor along with a time-tag to be used for the link travel-time calculation Vehicle classification 164 is accomplished by analyzing the range data recorded for a vehicle and matching the resultant profile to a defined set of rules. There are seven features that are used to classify a vehicle. The first feature that is calculated is the total length of the vehicle 166, which is derived from the length of each profile trend. Next, the height 168 of each plateau is compared to find the maximum plateau height. This feature will be used as the height of the vehicle. The average width 170 of the vehicle is only available if 3-dimensional data are being used. The ratio of plateau lengths to total length is used to determine how aerodynamic the vehicle is. The percentage of the vehicle above a 5 foot threshold and the height and length of the last plateau are features used for sub-classification.

If the speed of a vehicle falls below 1 mph, implying that the vehicle may have come to a complete stop below the sensor, all classification features that use length in their calculations have to be avoided. However, the maximum plateau height and average width are still available and are valid for vehicle classification.

A preferred embodiment of the software useful in connection with the sensor system and method of the co-pending invention is illustrated in flow charts and discussed in detail in the co-pending application. It will of course be understood that the software is loaded in an object code format into the microprocessor 500, and is designed to control the electrical-optical assembly of the sensor 100 in order to detect the presence of objects and to provide certain desirable outputs representative of the object, including for example, the speed with which the object moves through the area being sensed, the size and shape of the object, its classification and perhaps other characteristics. In one specific form, and as earlier described, the sensor 100 has utility as a vehicle sensor for mounting in an overhead configuration in order to detect the presence of vehicles passing through an area such as a portion of a roadway at an intersection to identify the presence of a vehicle, classify the vehicle as either an automobile, truck or motorcycle, count the number of vehicles passing through the intersection and calculate the speed of each vehicle and the flow rate of all of the vehicles. The software was specifically configured for those purposes.

As described with reference to FIGS. 21 through 27, software operates to find the range to the road. The software then sets up the receiver 400 to detect the return beam 106b, 110b, and the range and return-signal intensity is read; the range and intensity reading is then toggled between the two beams 106 and 110. Following the reading of the range and intensity from each of the two beams 106 and 110, any necessary offset is added to the range based on the intensity to correct timing walk as discussed earlier. The change in the range (i.e., the road distance minus the distance to any object detected) is calculated. If the resulting calculation is greater than the vehicle threshold, then a vehicle pulse counter is tested to determine if there have been 16 consecutive pulses above the vehicle threshold; if the calculation is less than the vehicle threshold, then another sequence of steps is initiated to reset the vehicle pulse counter and thereby toggle between the beams 106 and 110. Various resets and adjustments are made including the calculation of the distance between the two beams, the calculation of the average range to the road, and the minimum/maximum range to the road.

If the road pulse counter is reset, an inquiry is made as to whether the vehicle has already been detected; if the answer is affirmative, then an inquiry is made to determine if the change in range determined earlier is greater than the truck threshold in order to complete a truck-detection sequence. On the other hand, if the inquiry is negative, then the vehicle presence relay is set, a vehicle pulse counter is incremented, and a velocity timer is started for purposes of determining the speed of the vehicle passing through the area being sensed.

One embodiment of the software useful in connection with the sensor 100 and method of the present invention is illustrated in flow chart form in FIGS. 22 through 28 with portions of the software depicted in each of those figures being arbitrarily designated by reference numerals. It will of course be understood that the software is loaded in an object code format and is designed to control the sensor 100 electrical, optical and mechanical components as herein earlier described. In one specific form, the sensor 100 has utility for determining the speed of a vehicle and determining its vehicle classification through comparison of its three dimensional profile with known vehicles establish in a database. By way of example, the software modeling of FIGS. 21 through 27 has been specifically configured for these purposes.

Figure 21:
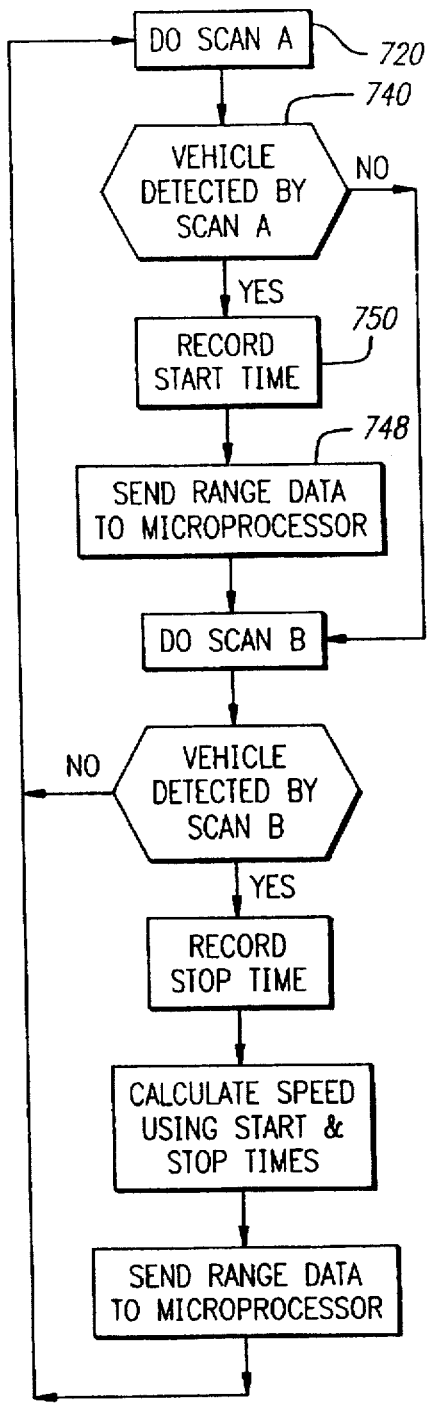
FIGS. 21 through 27 are interrelated flow charts illustrating a preferred embodiment of the software useful with the present invention.
Figure 22:
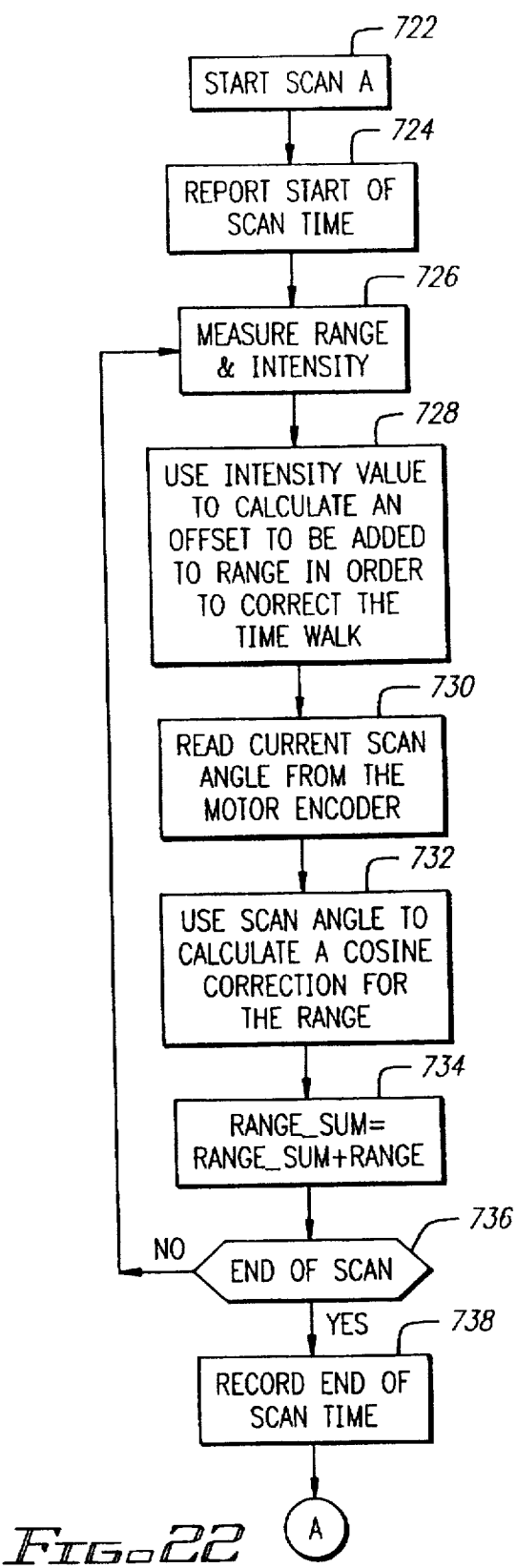
Figure 23:
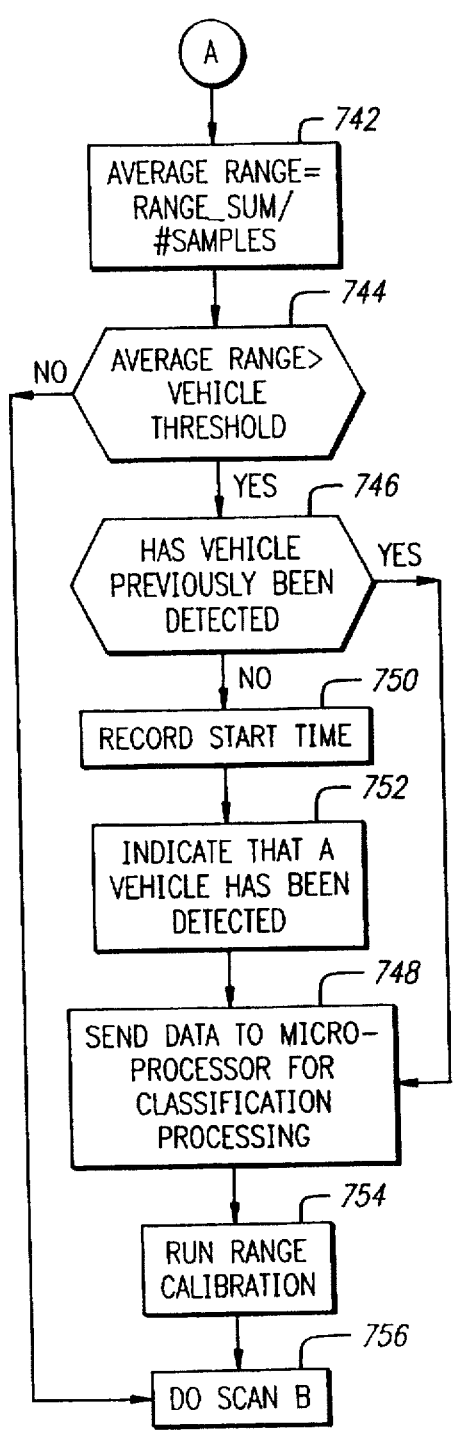
Figure 24:
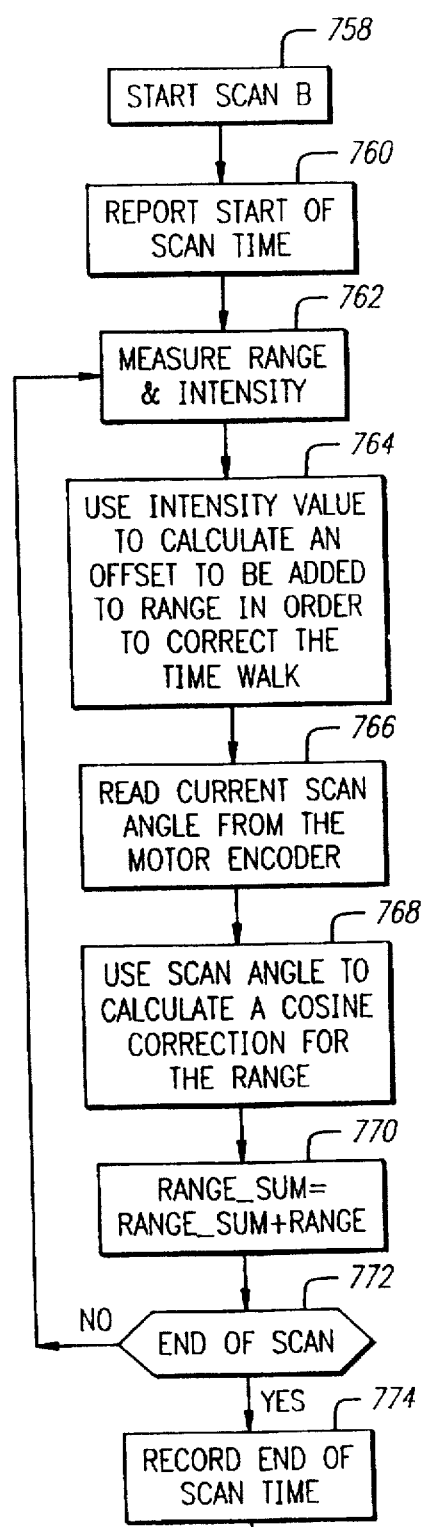
Figure 25:
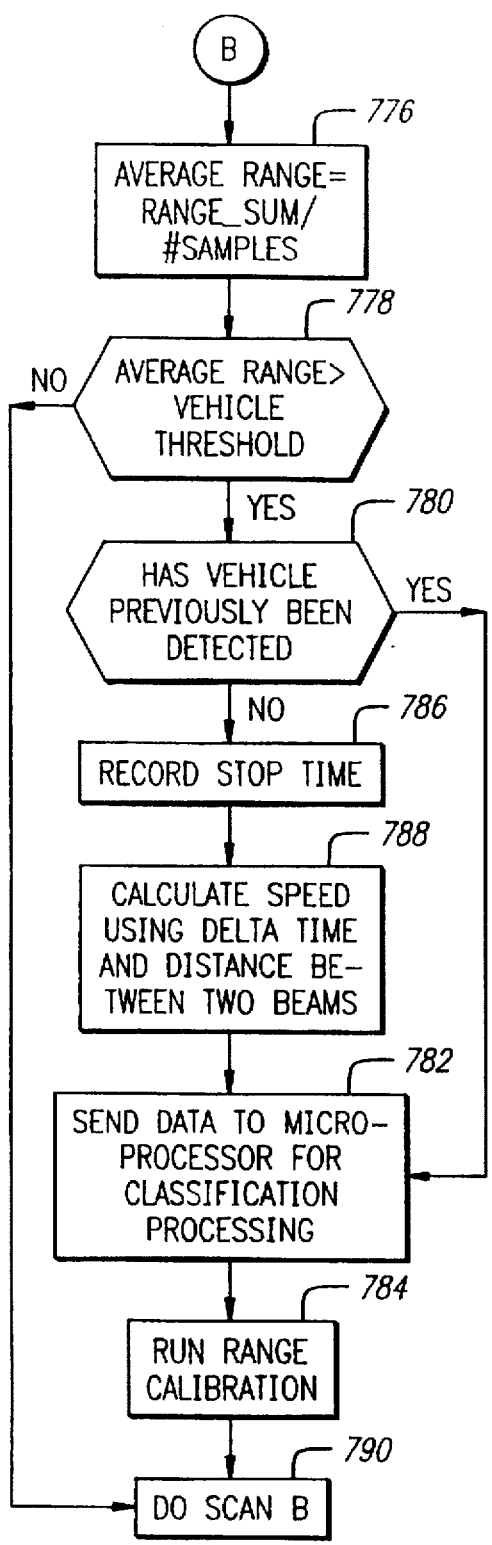

Referring first to FIG. 21, the microcontroller software scan 720 in the forward scanned beam 106. FIG. 22 further illustrates that this scan 720 is started 722 and the start time recorded 724. A range and intensity are measured 726 as described earlier. The intensity value is used to calculate an offset to be added to the range in order to correct for time walk 728. As described with reference to FIG. 17, the current scan angle 142 is determined from the motor encoder within the mirror electronics and the information used to calculate a cosine correction for the range 732 as earlier discussed. Ranges are accumulated 734 and recalculated at the various predetermined angle increments for the predetermined scan 736 and the end of the scan time is recorded 738. Once the scan cycle described is completed, it is determined whether a vehicle has been detected 740 by comparing ranges measured with sample ranges for database vehicles 742 and determining how such ranges compare 744 (refer to FIG. 23). If a vehicle has previously been detected 746 data is sent to the microprocessor for classification 748, start times are recorded 750 and vehicle detection indicated 752 if a vehicle was not previously detected. Co-pending software uses these 750 and 752 steps and has further detail included in its specification for a reference. A range calibration is run 754 and then the process begins for the backward scanned beam 756. As illustrated in FIG. 24, the backward scan begins 758 and the start time recorded 760. The process is as described in steps 762 through 774 and is as described for the forward scan in steps 722 through 738 and as described for the forward scan in 742 through 754 as 776 through 784 (see FIG. 25). Except in the backward scan processing, a stop time is recorded 786 if a vehicle was nor previously detected. With the start time from the vehicle crossing the forward beam and stop time when the vehicle crosses the backward beam, a speed is calculated using the time period determined and the known distance between the beams 106 and 110. Once the backward scan is completed for all the predetermined angles 28, the forward scan is then again begun 790.

Figure 26:
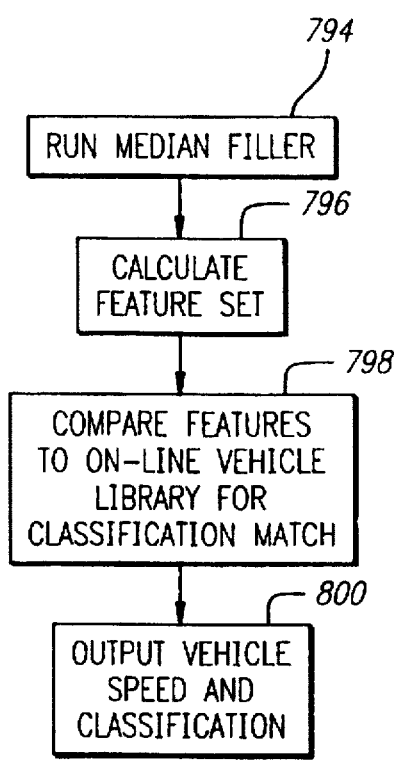
Figure 27:
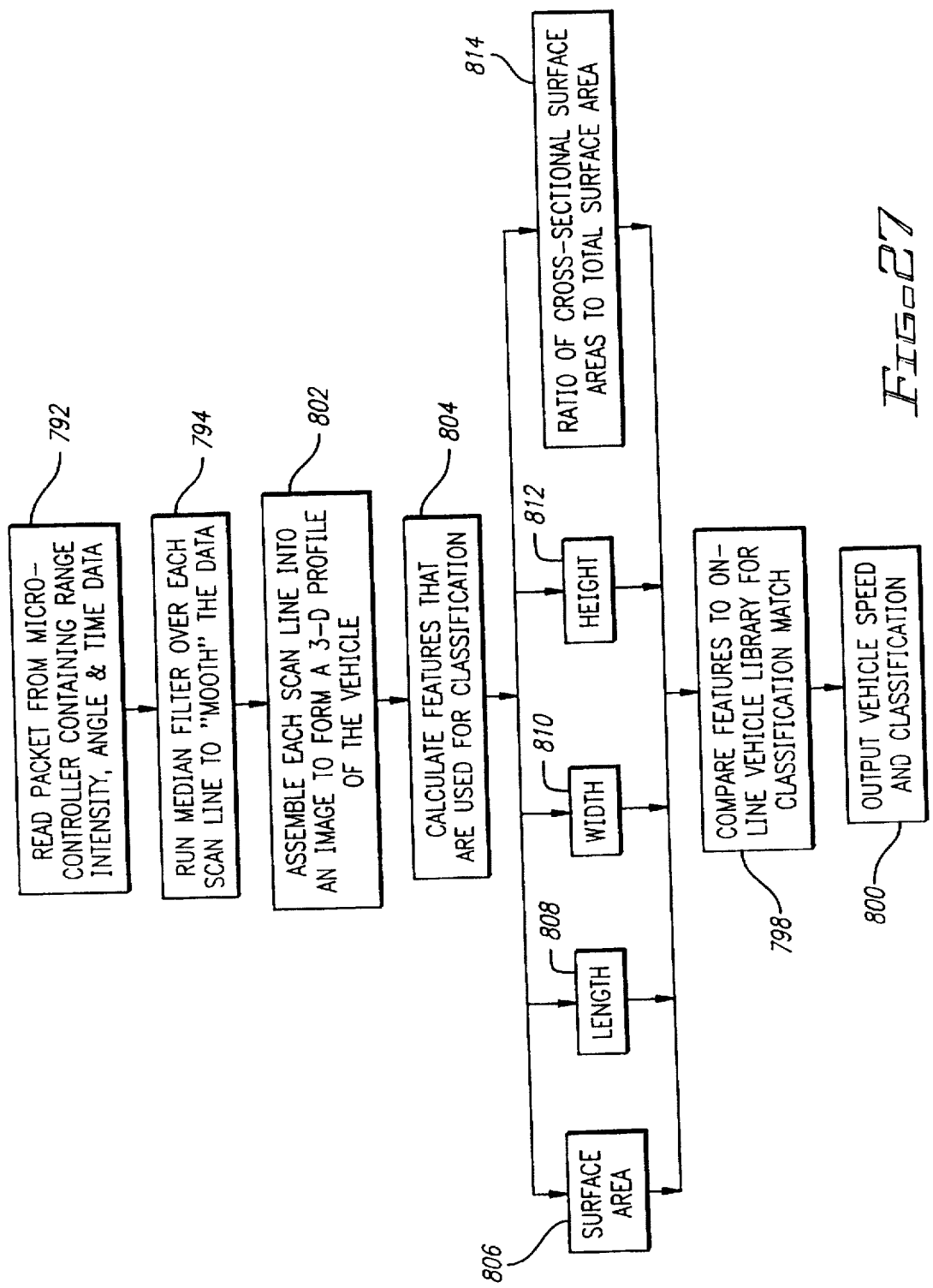

The range processor 502, completing its tasks as described, the data processor 504 performs its tasks which are illustrated in the flow charts of FIGS. 26 and 27. A data packet from the microcontroller 504 containing range, intensity, angle and time data 792 in FIG. 27, is processed through a median filter for smoothing over each scan profile 794. A feature set for the classification is calculated 796 for comparing the features of the vehicle detected to the features of vehicles contained in a vehicle database library 798 and vehicle speed and classification is provided as an output 800. In calculating a feature set for the detected vehicle (796 of FIG. 26), each scan is assembled into an image forming a three dimensional profile of the vehicle (802 of FIG. 27) as illustrated in FIG. 10. Features used in the calculation are calculated 804 and compared as discussed 798 and an output provided 800. The features compared are not limited to but include vehicle surface area 806, length of the vehicle 808, width of the vehicle 810, height of the vehicle 812, a ratio of cross-sectional surface area to total surface area 814 and intensity 792.

As described earlier in this specification section and in the co-pending application, the sensor 100 used in vehicle detection is useful in determining and recording other highway conditions such as visibility.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and alternate embodiments are intended to be included within the scope of the appended claims.

What is claimed is:

1. A sensor useful in determining the shape of a vehicle, the sensor comprising:

laser rangefinder means for determining a range from the sensor to points on a vehicle when the vehicle travels within a sensing zone and for providing range data outputs corresponding to sensor angles for ranges from the sensor to the points on the vehicle;

means for scanning the laser means within a plane generally orthogonal to a direction of travel for the vehicle, the scanning means communicating with the laser rangefinder means for determining a range for a corresponding point on the vehicle within the transverse plane, the scanning means providing means for determining the range and a corresponding sensor angle for each point within the scanning plane;

deflecting means cooperating with the scanning means for deflecting the scanned beam from a first position to a second position, the first and second positions defining a forward beam and a backward beam through which the vehicle travels; and means for processing the ranges, corresponding angles, and interception times for the vehicle receiving the first and second beams, the processing means providing a vehicle image profile representative of the vehicle.

2. A sensor useful in determining the shape of vehicles traveling over multiple adjacent lanes of a highway, the sensor comprising:

a housing for positioning above a highway having multiple lanes for receiving vehicles traveling thereover;

first and second laser transmitters carried by the housing, each laser transmitter transmitting a series of radiation pulses forming first and second beams respectively, the first and second transmitters each providing a trigger signal indicating the transmitting of each pulse within the series;

a beam scanner carried by the housing, the beam scanner having multiple reflective facets positioned for receiving the first and second transmitted beams and directing the beams toward the highway, the reflective facets intercepting the beams at varying incident angles for reflecting the beams through the varying angles and scanning the beams transversely across the highway, the scanned beams cooperating for providing a scan extending transversely across the multiple lanes, the reflective facets further arranged such that adjacent facets receiving the transmitted beams have differing orientations for alternately reflecting the beam from a first facet into a forward scanned beam and from a second facet into a rearward scanned beam, the forward and rearward scanned beams longitudinally divergent from each other, the beam scanner communicating with the first and second transmitters for providing an orientation signal indicating a direction of beam propagation for each transmitted pulse within the beam;

first and second laser receivers carried by the housing, each laser receiver receiving reflected first and second beams including pulses reflected back from the highway and vehicle for the respectively transmitted pulses of the first and second transmitted beam, the first and second receivers providing a return pulse signal indicating the receipt of each reflected portion of the transmitted pulse within the series; and a processor carried by the housing for processing the signals from the transmitters, receivers and scanner for providing range measurements from the sensor to the highway, from the sensor to the vehicle, corresponding angles for each range measurement, and a time for the vehicle to cross the forward and rearward scanned beams, the processor providing vehicle information useful in classifying the vehicle.

3. The sensor according to claim 2, wherein the laser transmitters comprise InGaAs diode laser transmitters.

4. The sensor according to claim 2, wherein the laser receivers comprise silicon avalanche photodiode receivers.

5. The sensor according to claim 2, wherein the beam scanner comprises a polygon rotating about a shaft, the polygon having the facets portioned continuously about the shaft for intercepting the transmitted beams, and wherein the first and second facets are adjacent facets positioned at an offset angles to each other for providing the forward and the rearward diverging beams.

6. The sensor according to claim 5, wherein the offset angle is approximately ten degrees.

7. The sensor according to claim 5, further comprising a shaft encoder engaging the shaft for providing a signal indicative of the shaft polygon orientation and thus the beam angle, the shaft encoder providing the orientation signal.

8. The sensor according to claim 2, further comprising a folding mirror carried within the housing for directing the beams from each of the transmitters and receivers to the beam scanner.

9. The sensor according to claim 2, wherein each receiver comprises an optical detector for detection of the reflected beam, the optical detector providing the return pulse signal.

10. The sensor according to claim 2, wherein the housing includes a light transmissive window for transmitting the beams therethrough, the window having a heater for maintaining a preselected temperature of the window during varying ambient conditions.

11. A sensor useful in determining the shape of vehicles traveling over multiple adjacent lanes of a highway, the sensor comprising:

first and second laser transmitters, each transmitting a series of radiation pulses forming first and second beams respectively, the first and second transmitters providing a trigger signal indicating the transmitting of each pulse within the series;

a beam scanner having multiple reflective facets positioned for receiving the first and second transmitted beams and directing the beams toward the highway, the reflective facets intercepting the beams at varying incident angles for reflecting the beams through the varying angles and scanning the beams transversely across the highway, the scanned beams cooperating for providing a scan extending transversely across the multiple lanes, the reflective facets further arranged such that alternating facets receiving the transmitted beams have differing orientations for alternately reflecting the beam from a first facet into a forward reflected beam and from a second facet into a rearward reflected beam, the forward and rearward beams longitudinally divergent from each other, the beam scanner communicating with the first and second transmitters for providing an orientation signal indicating a propagation direction for each transmitted pulse;

first and second laser receivers, each laser receiver receiving reflected first and second beams having a portion of the respectively transmitted pulses of the first and second transmitted beam, the first and second receivers providing a return pulse signal indicating the receipt of each reflected portion of the transmitted pulse within the series; and a processor for processing the signals from the transmitters, receivers and scanner for providing range measurements from the sensor to the highway, from the sensor to the vehicle, corresponding angles for each range measurement, and a time for the vehicle to cross the forward and rearward beams, the processor providing vehicle information useful in classifying the vehicle.

12. The sensor according to claim 11, wherein the beam scanner comprises a polygon rotating about a shaft, the polygon having the facets portioned continuously about the shaft for intercepting the transmitted beams, and wherein the first and second facets are adjacent facets positioned at an offset angle to each other for providing the forward and the rearward diverging beams.

13. The sensor according to claim 12, wherein the offset angle is approximately ten degrees.

14. The sensor according to claim 12, further comprising a shaft encoder engaging the shaft for providing a signal indicative of the shaft polygon orientation and thus the beam angle, the shaft encoder providing the orientation signal.

15. The sensor according to claim 11, wherein each receiver comprises an optical detector for detection of the reflected beam, the optical detector providing the return pulse signal.

16. A sensor useful in determining the shape of vehicles traveling over multiple adjacent lanes of a highway, the sensor comprising:

a laser transmitter for transmitting a series of radiation pulses, the transmitter providing a trigger signal indicating a transmission of each pulse;

a scanner having multiple reflective facets positioned for receiving the transmitted pulses and directing the pulses toward the highway, the reflective facets intercepting the pulses at varying incident angles for reflecting them through the varying angles and scanning the series of pulses transversely across the highway, the reflective facets further arranged such that alternating facets receiving the transmitted pulses have differing orientations for alternately reflecting the pulses from a first facet into a forward reflected series of pulses and from a second facet into a rearward reflected series of pulses, the forward and rearward transmitted series of pulses within a direction longitudinally divergent from each other, the scanner communicating with the transmitter for providing an orientation signal indicating a propagation direction for each transmitted pulse;

a receiver for receiving reflected pulses, the receiver providing a return pulse signal indicating the receipt of each reflected pulse; and a processor for processing the signals from the transmitter, receiver and scanner for providing range measurements from the time of transmission of a transmitted pulse to the time of receipt of a corresponding reflected pulse, the range measurements made from the sensor to the highway and from the sensor to the vehicle, corresponding angles for each range measurement and a time for the vehicle to cross the forward and rearward scanning planes provide vehicle profile and speed information useful in classifying the vehicle.

17. The sensor according to claim 16, wherein the beam scanner comprises a polygon rotating about a shaft, the polygon having the facets portioned continuously about the shaft for intercepting the transmitted pulses, and wherein the first and second facets are adjacent facets positioned at an offset angle to each other for providing the forward and the rearward scanning planes.

18. The sensor according to claim 16, wherein the offset angle is approximately ten degrees.

19. The sensor according to claim 16, further comprising a shaft encoder engaging the shaft for providing a signal indicative of the shaft polygon orientation and thus a direction of propagation for the transmitted pulse, the shaft encoder providing the orientation signal.

20. The sensor according to claim 16, wherein each receiver comprises an optical detector for detection of the reflected beam, the optical detector providing the return pulse signal.

21. A sensor useful in determining the shape of vehicles traveling over multiple adjacent lanes of a highway, the sensor comprising:

a laser rangefinder for transmitting and receiving a beam of pulsed radiation for determining a range to a point on a vehicle;

a scanner having multiple reflective facets positioned for receiving the transmitted beam and directing the beam transversely across the vehicle, the reflective facets intercepting the beam at varying incident angles for reflecting them through the varying angles and scanning the beam transversely across the vehicle, the reflective facets further arranged such that alternating facets receiving the transmitted pulses have differing orientations for alternately reflecting the beam into a forward reflected beam portion and into a rearward reflected beam portion, the forward and rearward transmitted beams longitudinally divergent from each other, the scanner communicating with the laser rangefinder for providing an orientation signal indicating a propagation direction for each transmitted pulse within the beam; and a processor for processing the signals from the laser rangefinder and scanner for providing range measurements for corresponding angles and a time for the vehicle to cross the forward and rearward scanning beams for providing vehicle profile and speed information useful in classifying the vehicle.

22. The sensor according to claim 21, wherein the beam scanner comprises a polygon rotating about a shaft, the polygon having the facets portioned continuously about the shaft for intercepting the transmitted beam, and wherein the first and second facets are adjacent facets positioned at an offset angle to each other for providing the forward and the rearward scanning beams.

23. The sensor according to claim 22, wherein the offset angle is approximately ten degrees.

24. The sensor according to claim 22, further comprising a shaft encoder engaging the shaft for providing a signal indicative of the shaft polygon orientation and thus a direction of propagation for the transmitted beam, the shaft encoder providing the orientation signal.

* * * * *